(12) United States Patent
Tellechea et al.

(10) Patent No.: US 11,787,560 B2
(45) Date of Patent: *Oct. 17, 2023

(54) COMPUTER-BASED SYSTEMS AND METHODS FOR FACILITATING AIRCRAFT APPROACH

(71) Applicant: Area 2601, LLC, Winter Park, FL (US)

(72) Inventors: Albert F. Tellechea, Winter Park, FL (US); Diego M. Alfonso, Orlando, FL (US); Joseph R. Collins, LaGrange, GA (US)

(73) Assignee: Area 2601, LLC, Winter Park, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,154

(22) Filed: Nov. 14, 2022

(65) Prior Publication Data
US 2023/0084419 A1  Mar. 16, 2023

Related U.S. Application Data

(63) Continuation of application No. 17/079,956, filed on Oct. 26, 2020, now Pat. No. 11,498,697, which is a
(Continued)

(51) Int. Cl.
*B64D 45/08* (2006.01)
*G06F 3/0489* (2022.01)
(Continued)

(52) U.S. Cl.
CPC .............. *B64D 45/08* (2013.01); *G01C 23/00* (2013.01); *G05D 1/0202* (2013.01);
(Continued)

(58) Field of Classification Search
CPC ...... B64D 45/08; G08G 5/025; G08G 5/0021; G08G 5/003; G08G 5/0034; G08G 5/0039;
(Continued)

(56) References Cited

U.S. PATENT DOCUMENTS

| 4,706,198 | A | * | 11/1987 | Thurman | ............. | G08G 5/0091 |
| | | | | | | 701/122 |
| 5,978,715 | A | * | 11/1999 | Briffe | .................... | G01C 23/00 |
| | | | | | | 701/16 |

(Continued)

FOREIGN PATENT DOCUMENTS

WO   WO2005050601   6/2005

OTHER PUBLICATIONS

PCT International Searching Authority: International Search Report and Written Opinion dated Jun. 11, 2018; entire document.

*Primary Examiner* — Russell Frejd
*Assistant Examiner* — Sara J Lewandroski
(74) *Attorney, Agent, or Firm* — Allen, Dyer, Doppelt & Gilchrist, P.A.

(57) ABSTRACT

A graphical user interface (GUI) system for facilitating aircraft approaching and landing includes a database for storing airfields information and associated one or more approach patterns. The system also includes a display screen with user input interface configured for selecting a pattern for an aircraft to approach and land on an airfield, displaying the selected pattern in an overhead graphical view of the airfield according to the related information stored in the database. The system further includes a processing unit in signal communication with the database, one or more aircraft position sensors, and the display screen. The processing unit is configured to receive aircraft location and movement information from one or more aircraft sensors, airfield information from the database, and user input from the user input interface to determine display content and format of the display content on the display screen.

19 Claims, 36 Drawing Sheets

Related U.S. Application Data continuation of application No. 15/942,671, filed on Apr. 2, 2018, now Pat. No. 10,815,003.

(60) Provisional application No. 62/637,090, filed on Mar. 1, 2018, provisional application No. 62/542,483, filed on Aug. 8, 2017, provisional application No. 62/542,498, filed on Aug. 8, 2017, provisional application No. 62/479,401, filed on Mar. 31, 2017.

(51) Int. Cl.
| | | |
|---|---|---|
| *G08G 5/00* | (2006.01) | |
| *G05D 1/02* | (2020.01) | |
| *G01C 23/00* | (2006.01) | |
| *G08G 5/02* | (2006.01) | |

(52) U.S. Cl.
CPC ......... *G06F 3/0489* (2013.01); *G08G 5/0021* (2013.01); *G08G 5/0047* (2013.01); *G08G 5/0086* (2013.01); *G08G 5/0091* (2013.01); *G08G 5/025* (2013.01)

(58) Field of Classification Search
CPC .. G08G 5/0047; G08G 5/0086; G08G 5/0091; G01C 23/005
See application file for complete search history.

(56) References Cited

U.S. PATENT DOCUMENTS

| | | | | |
|---|---|---|---|---|
| 7,818,100 B2* | 10/2010 | Goodman | ............ | B64C 25/426 |
| | | | | 701/16 |
| 8,576,113 B1* | 11/2013 | Seah | ............. | G01S 13/935 |
| | | | | 342/36 |
| 9,424,756 B2* | 8/2016 | Gaertner | ............. | G08G 5/02 |
| 10,815,003 B2* | 10/2020 | Tellechea | ............. | G01C 23/00 |
| 2003/0120779 A1 | 6/2003 | Rodefer et al. | | |
| 2003/0206120 A1 | 11/2003 | Ishihara et al. | | |
| 2006/0253232 A1* | 11/2006 | Gerrity | ............. | G08G 5/0086 |
| | | | | 701/16 |
| 2007/0013558 A1* | 1/2007 | Ishihara | ............. | G08G 5/025 |
| | | | | 340/946 |
| 2008/0262664 A1* | 10/2008 | Schnell | ............. | G01C 23/00 |
| | | | | 701/4 |
| 2010/0039438 A1* | 2/2010 | Kennedy | ............. | G09B 29/006 |
| | | | | 345/581 |
| 2010/0094485 A1 | 4/2010 | Verlut et al. | | |
| 2010/0161156 A1* | 6/2010 | Coulmeau | ............. | G08G 5/0056 |
| | | | | 701/3 |
| 2011/0144832 A1 | 6/2011 | McDowell et al. | | |
| 2011/0264312 A1 | 10/2011 | Spinelli et al. | | |
| 2012/0310450 A1* | 12/2012 | Srivastav | ............. | G09B 9/08 |
| | | | | 701/3 |
| 2014/0163784 A1 | 6/2014 | Parthasarathy | | |
| 2014/0277857 A1 | 9/2014 | Bourret | | |
| 2014/0309817 A1* | 10/2014 | Burgin | ............. | G08G 5/0091 |
| | | | | 701/3 |
| 2014/0331161 A1 | 11/2014 | Venkataswamy et al. | | |
| 2014/0343765 A1 | 11/2014 | Suiter et al. | | |
| 2015/0081197 A1 | 3/2015 | Gaertner et al. | | |
| 2015/0261379 A1* | 9/2015 | Kneuper | ............. | B64D 43/00 |
| | | | | 345/173 |
| 2015/0294573 A1* | 10/2015 | Conner | ............. | G08G 5/0013 |
| | | | | 701/408 |
| 2017/0030735 A1 | 2/2017 | Mohideen et al. | | |
| 2017/0083206 A1* | 3/2017 | He | ............. | G08G 5/0021 |
| 2018/0122250 A1* | 5/2018 | Wapenski | ............. | B64C 25/426 |
| 2018/0232097 A1* | 8/2018 | Kneuper | ............. | G06F 3/0416 |
| 2019/0278299 A1* | 9/2019 | Reist | ............. | G05D 1/0088 |

\* cited by examiner

| PATTERN ALTITUDE (AGL) | 1000 ft | 1500 ft | 2000 ft |
| --- | --- | --- | --- |
| BASE | 1 nm | 1.5 nm | 2 nm |
| DOWNWIND | 1 nm | 1.5 nm | 2 nm |
| ENTRY ANGLE | 45° | 45° | 45° |
| | A1 | A1.5 | A2 |

COMPUTER-BASED SYSTEMS AND METHODS FOR FACILITATING AIRCRAFT APPROACH

CROSS-REFERENCE TO RELATED APPLICATION

This application is a continuation of U.S. Non-provisional patent application Ser. No. 17/079,956, filed on Oct. 26, 2020, which is a continuation of U.S. patent application Ser. No. 15/942,671, filed Apr. 2, 2018, which claims the benefit of U.S. Provisional Patent Application Ser. No. 62/479,401, filed on Mar. 31, 2017, U.S. Provisional Patent Application Ser. No. 62/542,498, filed on Aug. 8, 2017, U.S. Provisional Patent Application Ser. No. 62/542,483, filed on Aug. 8, 2017, and U.S. Provisional Patent Application Ser. No. 62/637,090, filed on Mar. 1, 2018, the contents of which applications are herein incorporated by reference in their entirety.

FIELD OF THE INVENTION

The present invention relates to computer-based flight aids, and more particularly, to systems and methods for facilitating approaches and landings conducted under visual and instrument flight rules (VFR).

BACKGROUND OF THE INVENTION

Numerous computer-based tools have been developed to assist pilots with various aspects of flying an airplane. For example, navigational programs exist that allow a pilot to enter a destination and/or waypoints for a trip and have the same displayed on a moving map, along with a recommended course and speed. Instrument landing systems (ILSs) also exist that provide visual indications to guide a pilot during landing. While such systems have proved useful and reliable, further improvements are possible.

For instance, many approaches and landings are made under visual flight rules (VFR). While clear guidelines exist as to the requirements for VFR approaches and landings, implementing those guidelines in the cockpit while also piloting the aircraft under stressful conditions can be a significant challenge, even for experienced pilots. During an approach, a pilot can have to monitor other traffic, handle communications and land the plane—under the constraints of the VFR approach and landing guidelines.

In addition, landing on a moving runway such as a flight deck of an aircraft carrier is one of the most difficult things a navy pilot will ever do. A flight deck is only a short runway but a moving one. Therefore, a system with automatic runway computing and an intuitive display of the landing profile will greatly benefit a pilot in landing on a moving runway.

SUMMARY OF THE PRESENT INVENTION

In view of the foregoing, it is an object of the present invention to provide computer-based systems and methods for facilitating aircraft approaches to runways. In particular, it is an object of the invention to provide a graphical user interface that will allow a user to select quickly and intuitively a desired VFR approach pattern for a runway and provide a visual depiction of the selected pattern.

According to one embodiment of the present invention, a graphical user interface (GUI) system for facilitating aircraft approaching and landing includes a database for storing airfields information and associated one or more approach patterns. The system also includes a display screen with user input interface configured for selecting a pattern for an aircraft to approach and land on an airfield, displaying the selected pattern in an overhead graphical view of the airfield according to the related information stored in the database. The system further includes a processing unit in signal communication with the database, one or more aircraft position sensors, and the display screen. The processing unit is configured to receive aircraft location and movement information from one or more aircraft sensors, airfield information from the database, and user input from the user input interface to determine display content and format of the display content on the display screen.

According to another embodiment of the present invention, a computer-based system for facilitating aircraft approach and landing includes a user input interface configured for selecting and approaching an airfield and a display format and a processing unit in signal communication with the database and user input interface. The processing unit is configured for determining aircraft position and movement in relation to the selected airfield and calculating an approach pattern based on the aircraft position and the selected airfield. The system further includes a display screen configured for displaying the aircraft movement corresponding spatially to the calculated approach pattern in a selected display format.

According to another embodiment of the present invention, a computer-based GUI system for facilitating aircraft approaching and landing on a moving runway includes a runway position determination unit configured to determine location and movement of a moving runway in real time. A processing unit is configured to receive aircraft location and movement information from an aircraft location sensor and receive runway location and movement information from the runway determination unit. The processing unit is configured to determine an approach pattern based on real time location data for the aircraft and the runway. The system further includes a display screen with a user input interface configured for approaching the input runway based on associated airfield information and a specific display format displaying the calculated pattern in the specific display format.

According to one embodiment of the present invention, a method for facilitating aircraft approach includes storing information of one or more airfields and one or more approach patterns associated with the one or more airfields in a database of a computer-based system. An approach pattern is selected based on location and movement of an aircraft and an airfield received via a user input interface of the computer-based system. The aircraft movement corresponding spatially to the selected approach pattern is calculated via a processing unit of the computer-based system. The aircraft movement corresponding spatially to the approach pattern is displayed in a selected view via a display screen of the computer-based system.

These and other objects, aspects and advantages of the present invention will be better appreciated in view of the drawings and following detailed description of preferred embodiments.

DETAILED DESCRIPTION OF PREFERRED EMBODIMENTS

According to an embodiment of the present invention, a computer-based system and method for facilitating aircraft approach are implemented on a computer device including one or more processors, memory storage devices, user input devices and displays. Preferably, the computer device is further configured to transmit and receive data via a network, such as the Internet and/or other local or wide area network. The computer device can be implemented in any form, but a personal electronic device such as a tablet computer or smart phone with a touch-screen display is a preferred embodiment. Additionally, the computer device could be configured for integration into the instrument panel of an aircraft. Moreover, the computer device could be integrated into or configured to interface with other aircraft systems (e.g., an autopilot system, navigational system, etc.), as well as control systems external to the aircraft (e.g., some type of active ground-based control or tracking system).

Figure 1:
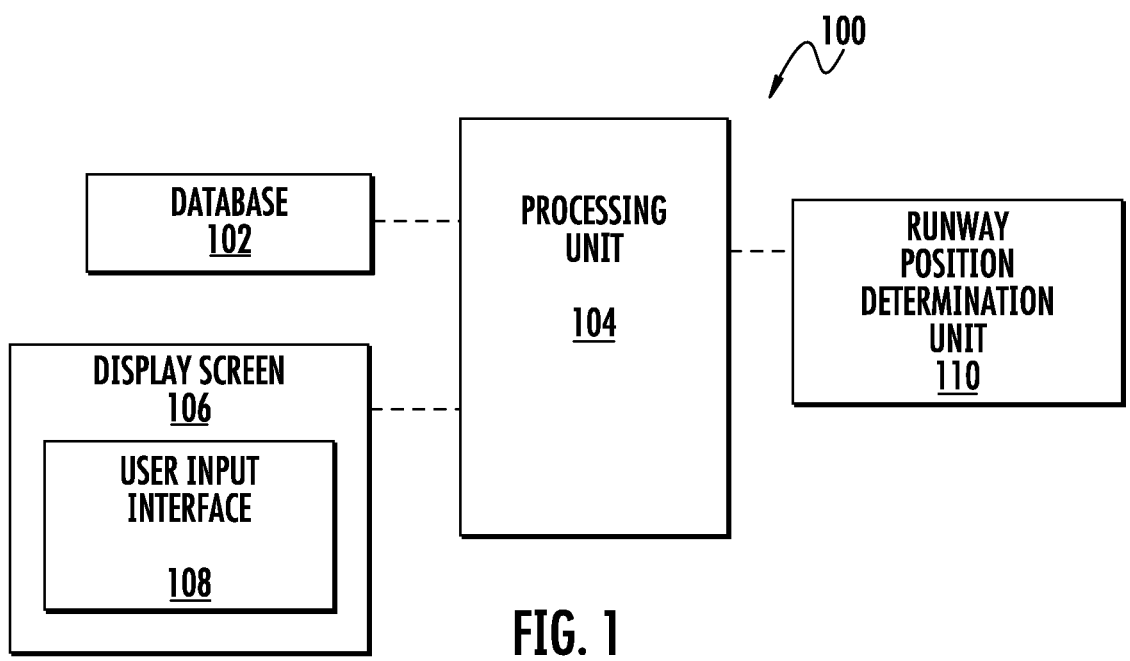
FIG. 1 is a block diagram of the system for facilitating aircraft approaching and landing, according to another embodiment of the present invention.
Figure 2:
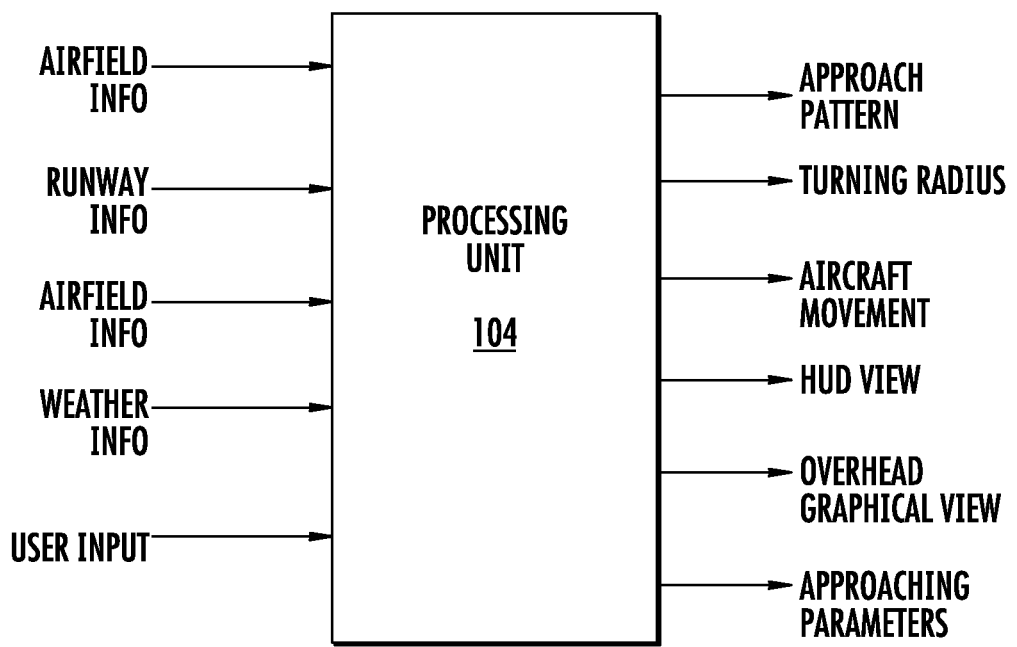
FIG. 2 is another block diagram of the system for facilitating aircraft approaching and landing, according to another embodiment of the present invention.

Referring to FIGS. 1 and 2, according to one embodiment of the present invention, a GUI system 100 for facilitating aircraft approaching and landing can include a database 102, a display screen 104 with a user input interface 106, and a processing unit 108.

The database 102 is configured for storing airfield information and one or more associated approach patterns for many airfields. As an example, the airfield information stored in the database 102 can include airfield information, runway information and runway end information for a particular airfield. The airfield information can include coordinates, an identifier, a designator, a location indicator, name, type, filed elevation, ownership type, manager and radio frequency associated with one or more airfields. The runway information can include an identifier, designator, length, width, composition, surface condition, and longitude and latitude of runway ends. The runway end information can include an identifier, a designator, coordinates, bearing, elevation, elevation of a touchdown zone, and a glide path associated with the runway end.

The user input interface 106 is configured for selecting an approach pattern for aircraft approaching and landing and displaying the selected pattern in an overhead graphical view of the corresponding airfield according to the related information stored in the database 102.

The display screen 104 is configured to display an overhead graphical view such as an aerial view or a satellite view. As an example, airfield, runway, pattern altitude, entry angle, and respective lengths associated with a downwind base leg and one or more altitude gates, descent gates, and glide path guidance indicator are displayed in the overhead graphical view. The display screen 104 is further configured for displaying an airfield information diagram and a standard aviation chart. The display screen 104 can also display one or more of aircraft coordinates, altitude, horizontal accuracy, vertical accuracy, course, speed, and timestamp of the aircraft in real-time.

The display screen 104 is further configured to display a head-up display (HUD) superimposed on a camera view. As an example, a full screen HUD is displayed. As another example, a split view is displayed. In this case, a HUD superimposed on a camera view is displayed on one side of the display screen 104 and an overhead graphical view of an airfield to be approached is displayed on the other side of the display screen 104. The HUD view can include a guidance box configured to indicate an aircraft real-time position in relation to a selected approach pattern.

The display screen 104 can be updated periodically in response to aircraft movement. The display screen 104 can be configured to use colored indicators to distinguish between different types of airfields (e.g., public, private, military, helicopter and seaplane base).

The user input interface 106 includes a data entry keypad. The data entry keypad is dynamically updated based on an approach pattern and current location of the aircraft relative to the approach pattern. For example, a first keypad is displayed to select an airfield (e.g., text entry search). As another example, a second keypad is displayed to select an approach pattern. As another example, a third keypad is displayed to modify a selected approach pattern. As another example, a fourth keypad is displayed to define a landing lane and a corresponding approach pattern.

The system processing unit 108 is configured to receive aircraft location and movement information from the one or more aircraft sensors, airfield information from the database 102, and user input from the user input interface 106, to determine display content and format of the display content on the display screen. As an example, the aircraft location and movement information includes global positioning system (GPS), and inertial navigation system (INS) system, a camera, and a laser sensor, computer vision, and the like. For example, at least one camera and computer vision can acquire, process, and analyze video digital images obtained by one or more camera, and extract high-dimensional data from the real world in order to produce numerical or symbolic information. As such, visual images is transformed into numerical and/or symbolic information (e.g., location information, moving speed, etc.) that can interface with thought processes of the procession unit 108.

As an example, the processing unit 108 is configured to select a default approach pattern based on aircraft location and movement. As another example, the processing unit 108 is configured to calculate or update automatically an approach pattern if a previously selected pattern does not apply to current aircraft location and movement. As another example, the processing unit 108 is configured to calculate one or more turning radii of an approach pattern based on aircraft location, movement and weather condition. As another example, the processing unit 108 can receive a calculated approach pattern from a third party (e.g., a air traffic control system).

According to another embodiment of the present invention, when a runway is moving, the system further includes a runway position determination unit 110 configured to determine runway location and movement in real-time. For example, the runway position determination unit 110 is configured to receive signals indicating location and orientation of the runway from one or more transmitters on the moving runway. In this case, the processing unit 108 is further configured to receive runway location and movement information from the runway determination unit and determine an approach pattern based on real time location of the aircraft and runway. Alternatively or additionally, runway information can be manually input by a user (e.g., pilot). The processing unit 108 is configured to account for the real-time location of the moving runway in calculating aircraft movement corresponding spatially to the selected approach pattern.

Figure 3:
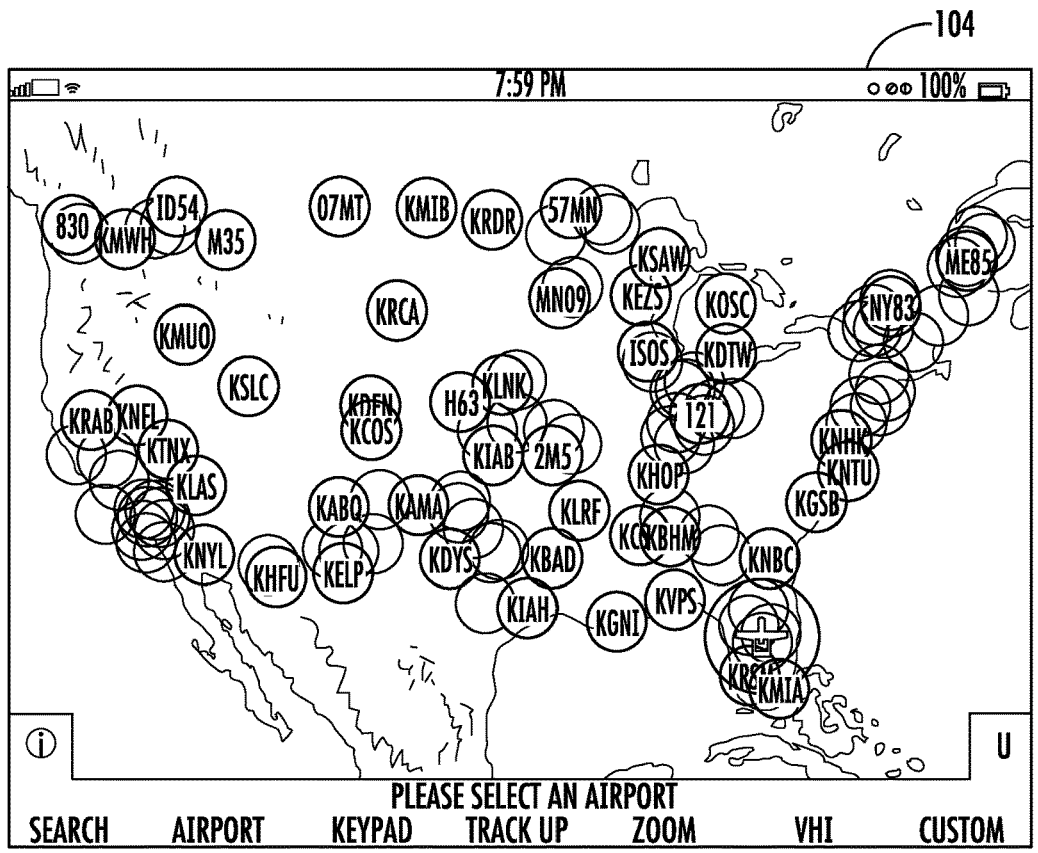
FIG. 3 is a screen view of an airfield selection screen of a computer-based system for facilitating aircraft approach, according to an embodiment of the present invention.
Figure 4:
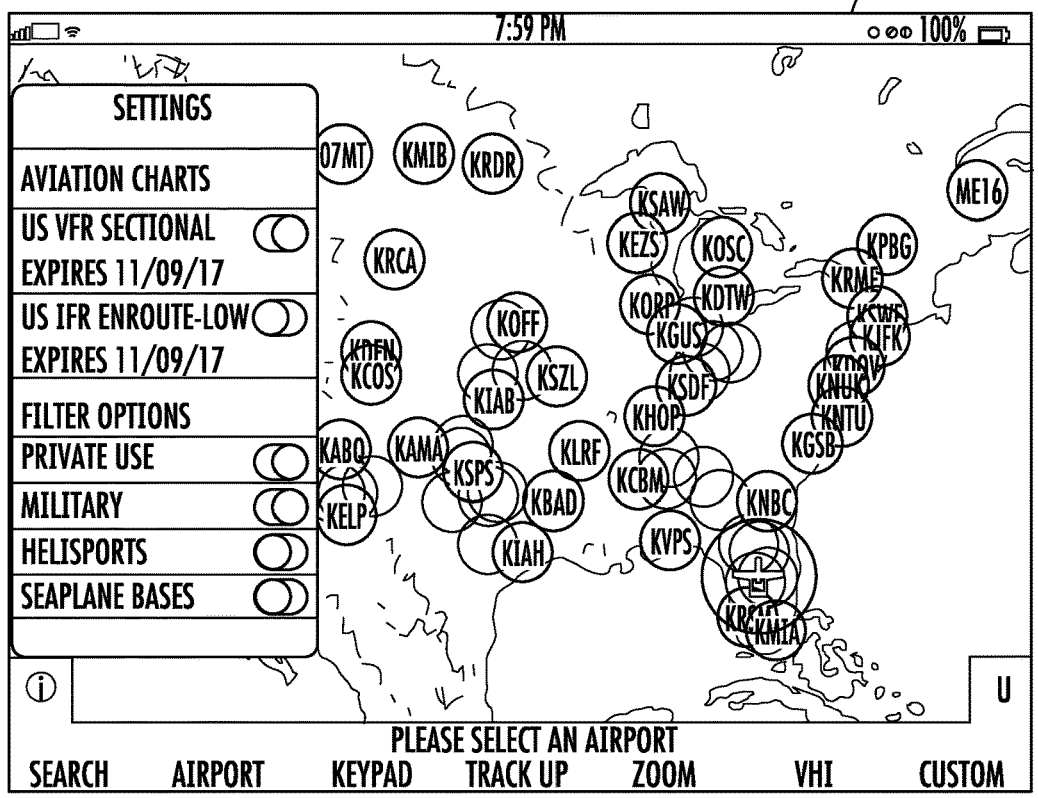
FIG. 4 is another screen view of an airfield selection screen of the system, according to another embodiment of the present invention.

Referring to FIG. 3, an opening page on the display screen of the GUI system 100 includes a plurality of circles and each circle represents an airfield. A pinch gesture to zoom in will display more airfields. The circles are color codes with each color representing a different type of airfield. Referring to FIG. 4, the number of airfields can be filtered by a user indicating the type of airfield to be displayed. Airfield information and the associated one or more approach patterns can be stored in a database.

Figure 5:
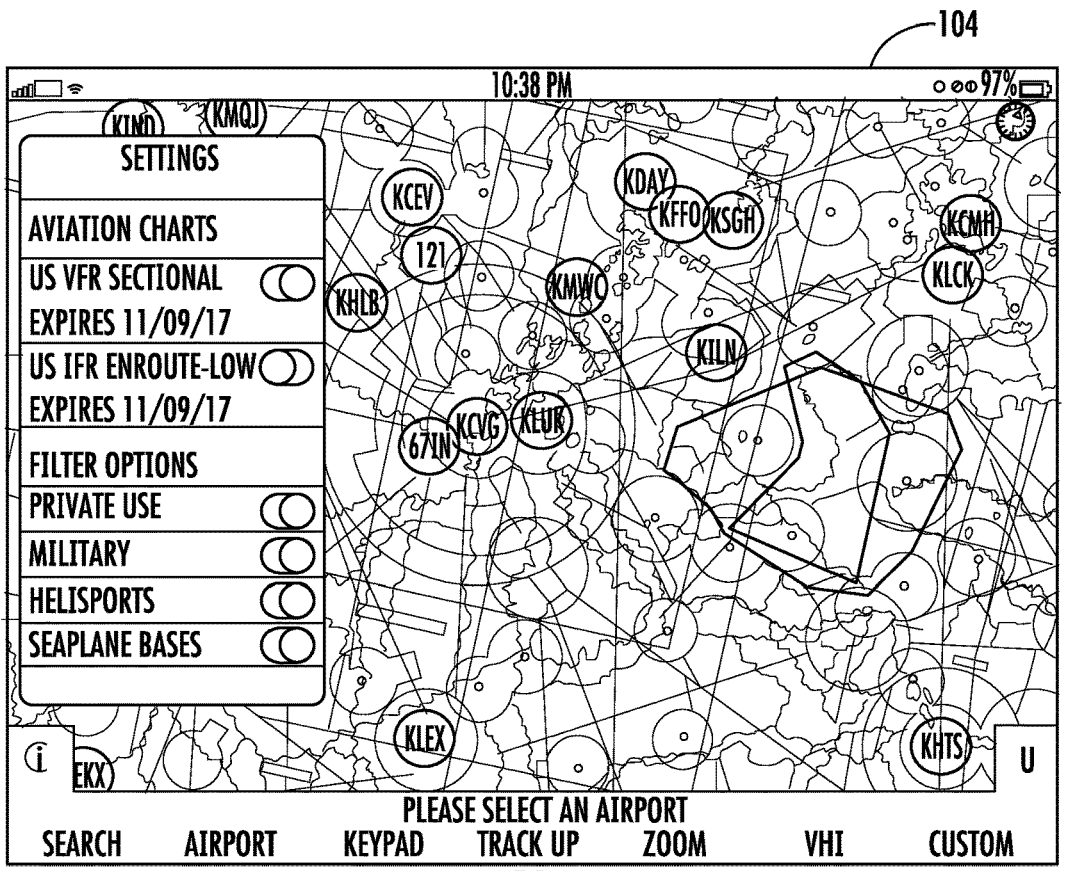
FIG. 5 is a screen view of a VFR sectional chart of the system, according to another embodiment of the present invention.
Figure 6:
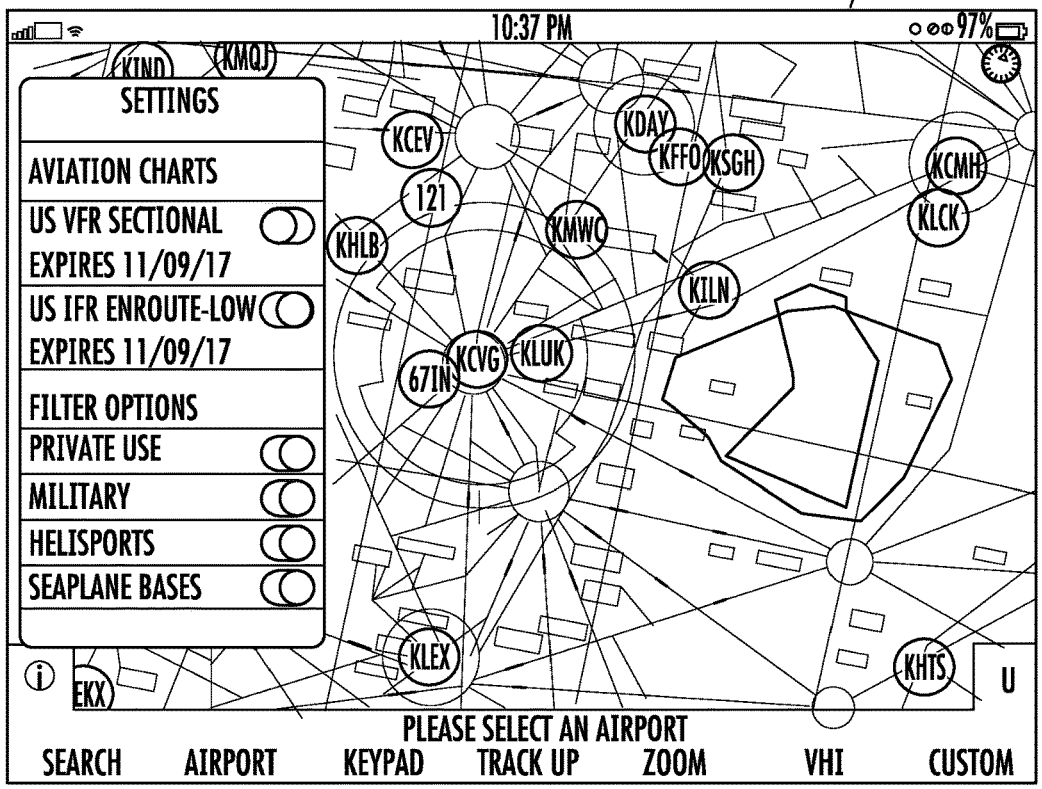
FIG. 6 is a screen view of a IFR chart of the system, according to another embodiment of the present invention.

The display screen 104 is configured to display an overhead graphical view of an airfield to be approached. For example, referring to FIG. 5, when the user selects "US VFR Sectional" view, the VFR sectional view of a corresponding area is displayed. As another example, referring to FIG. 6, when user selects "US IFR Enroute-Low" view, the IFR Enroute-Low chart of the corresponding area will be displayed. Other views can be displayed, such as standard aviation charts and airfield information diagrams.

Figure 7:
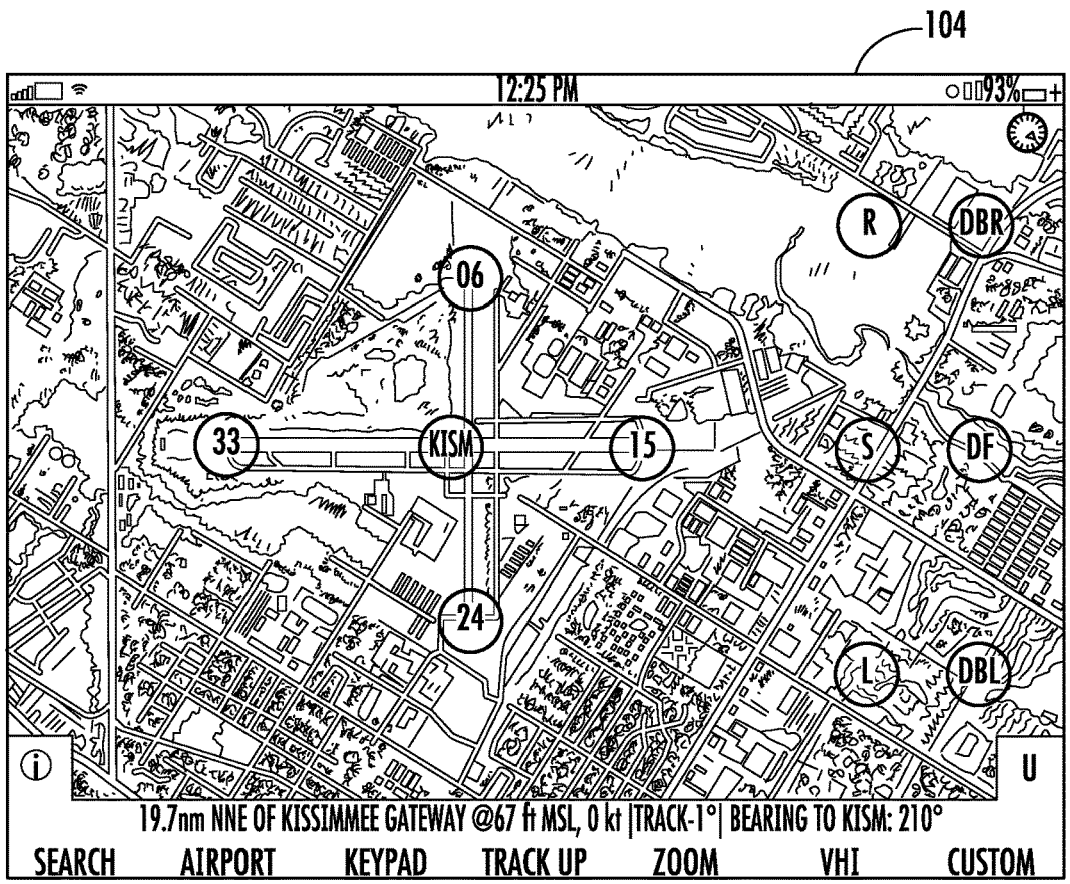
FIG. 7 is a screen view of an overhead graphical view of the system after user makes a section to an airfield.

The GUI system 100 is also configured to select and display an airfield pattern in a graphical view on the display screen. Referring to FIG. 7, after the user has selected an airfield, runways and possible approach patterns are displayed on the display screen. The possible approach patterns are shown as six additional buttons. Each button represents a different traffic pattern.

Figure 8:
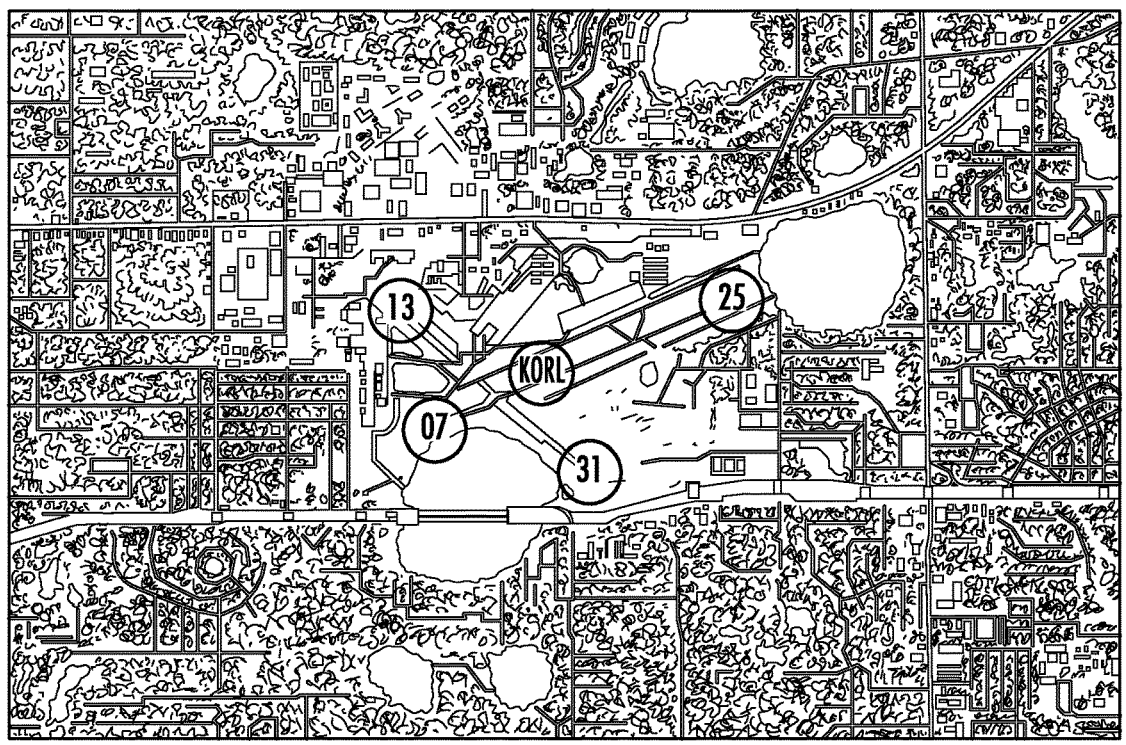
FIG. 8 is a screen view of a runway selection screen, according to an embodiment of the present invention.

Referring to FIG. 8, an aerial or satellite view of an airfield is superimposed on the display of an airfield indicator (KORL in FIG. 8) and indicators of each runway (07/25 and 13/31 in FIG. 8). For example, the indicators for the straight-in (S) and direct-to-final (DF) approaches are in the middle of their respective rows and aligned with the runway and runway indicator. For approaches with a base leg [i.e., downwind (R and L) and direct-to-base approaches (DBR and DBL)], the indicators are to the right or left of the central indicator (right and left being relative to the selected runway). Thus, the positions of the indicators correspond to the direction in which the base leg, when drawn, would extend away from the final leg.

Figure 9:
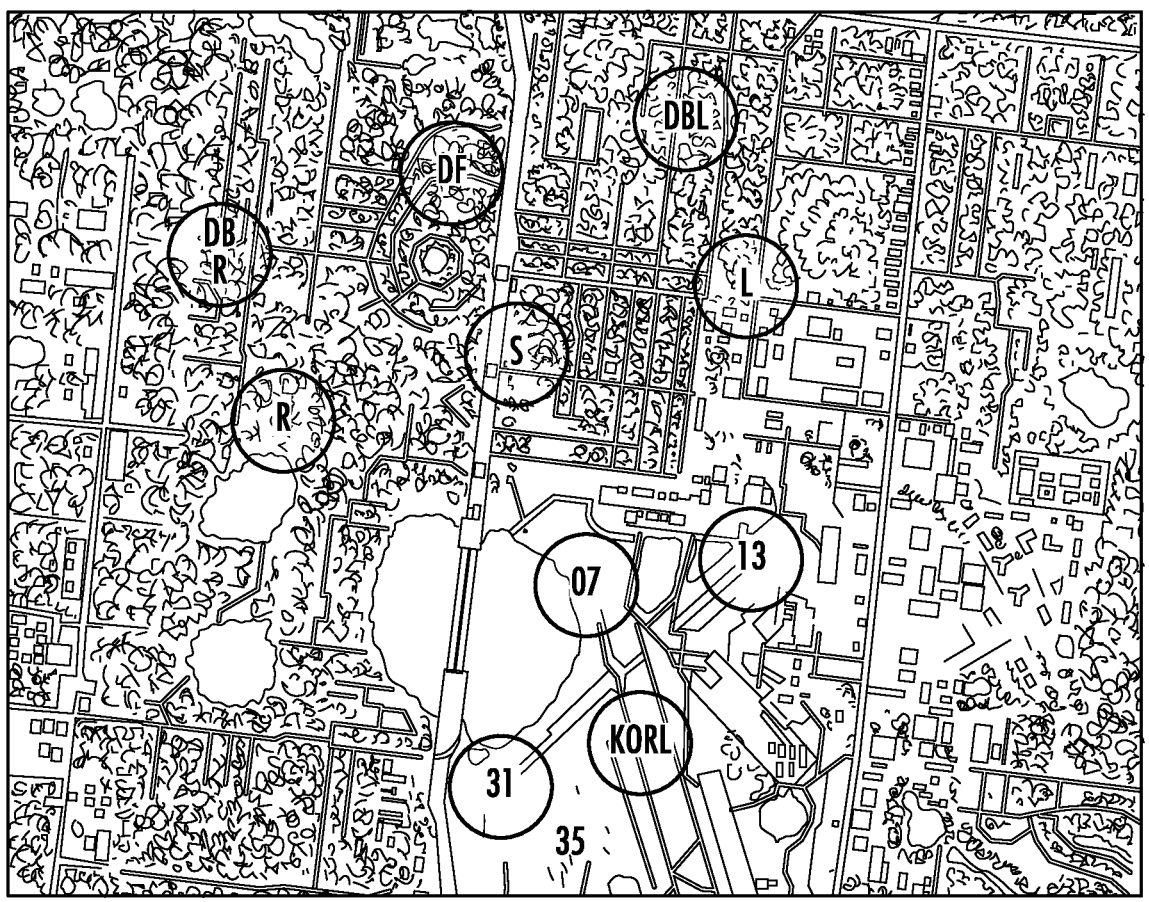
FIG. 9 is a screen view after runway selection, further displaying approach selection indicators.

The overall display orientation, once an airfield is selected, is preferably set to place the current bearing to the airfield from the aircraft at the top of the display. Alternate orientations can be selected (e.g., north at the top, aircraft heading at the top, etc.). To facilitate an intuitive runway selection, each runway indicator is located adjacent the beginning of image of the corresponding runway. Upon selecting the desired runway to approach, indicators for each approach type are then displayed for the selected runway, as shown in FIG. 9. Preferably, the indicators are arranged in two rows of three, the axis of each row being perpendicular to the selected runway and the rows and the middle indicators of each row being aligned with the runway (and selected runway indicator) in a location before the beginning of the runway.

Figures 10, 11:
FIG. 10 is a screen view after approach selection, further displaying the select approach and applicable altitude gates.
FIG. 11 is a tabular view of system defaults used in connection with approach displays.

Referring to FIG. 10, once one of the several approaches is selected, the selected approach route is overlaid, to scale, on the display screen 104. Preferably, by reselecting the airfield indicator, the runway indicators are redisplayed to allow the user to select a different approach option. A status indicator is advantageously also displayed, allowing the user to see at a glance which airfield, runway and approach are selected. The "A1" and "STD" terms refer to standard approaches using predefined parameters in the system, which will be discussed in greater detail below.

Cross-hatches on the displayed approach route represent altitude gates, with corresponding altitudes, preferably automatically referenced to mean sea level, also displayed. In FIG. 11, the cross-hatch on the arrival leg (pattern altitude gate) represents the point at which the aircraft should have descended to pattern altitude, drawn at a predetermined distance before the entry point. The cross-hatch on the downwind leg (descent gate) represents the point at which the aircraft should begin descending to an altitude so as to intercept the proper glide path on final. The descent gate is drawn at a 90-degree angle from the beginning of the runway being approached. When the aircraft reaches final landing, a glide path intercept gate is advantageously also displayed on final prior to actual interception of the glide path altitude.

It will be appreciated that a VFR approach can be performed according to one of several prescribed patterns, with each VFR pattern having one or more legs with dimensional parameters relative to one or more reference points along the length of the runway being approached for landing. A common leg in any VFR approach is the leg aligned with the runway on which the aircraft makes its final descent to a landing (or aborted landing).

The user interface implemented by the system and method of the claimed invention allows a pattern corresponding to any VFR approach (including approach, arrival and landing segments) to be displayed with only two inputs required from the user—regardless of the runway or type of approach desired. Moreover, the arrangement of the selection indicators allows for a highly intuitive selection, in which the location of the indicators corresponds spatially to the desired pattern.

One manner in which the system and method allow for rapid selection of a wide variety of patterns is the use of "standard" pattern default values. Referring to FIG. 11, three sets of default values are shown (A1, A1.5 and A2). These settings are shortcuts for quick display of one of three common approach patterns associated with three categories of aircraft. Specifically, A1 is designed for low-performance piston aircraft, A1.5 for high-performance and multi-engine piston aircraft, and A2 for turbine- or jet-powered aircrafts.

As can be seen in FIG. 10, the A1 defaults were used to generate the displayed route. The user can preselect a set of default values to be used for the initial generation of approach routes for display and select different default values after a an initial route is drawn. While the depicted default values represent a pre-loaded preferred embodiment, the user can enter and save custom values.

Figure 12:
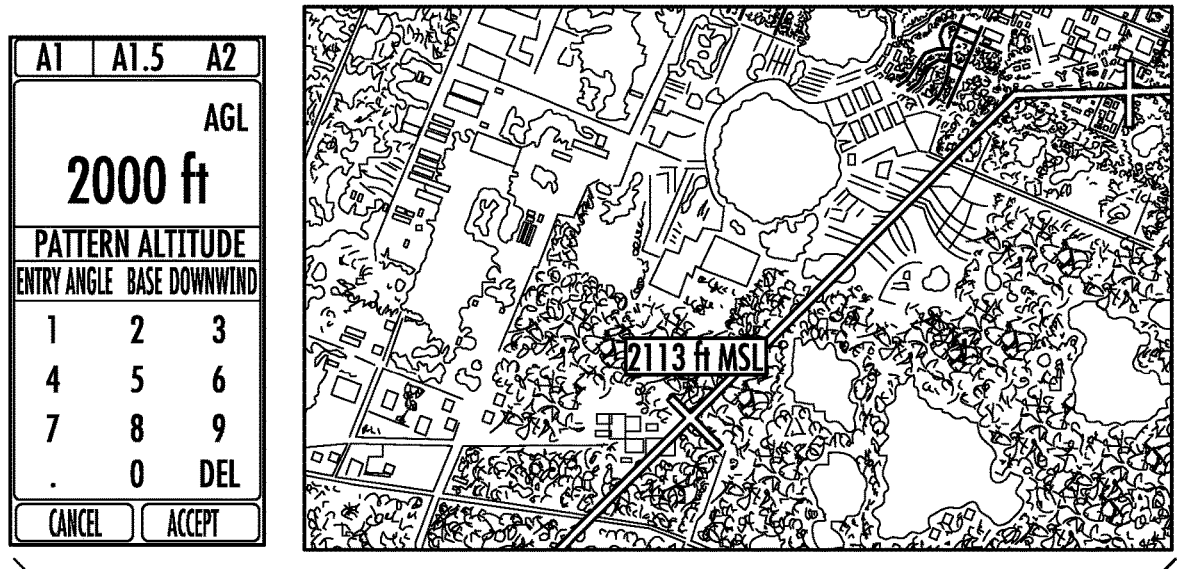
FIG. 12 is a screen view including a keypad for altering aspects of the displayed approach.

In addition to permitting quick selections based on default values, the user input interface also facilitate deviations from the default values using a data entry keypad. Referring to FIG. 12, the keypad is advantageously implemented via the display and is automatically reconfigurable by the system. In FIG. 12, the keypad offers selections for a user to set a different pattern altitude, entry angle, and different lengths for the downwind and base legs. As can be seen, although the A1 defaults were selected, the user has used the keypad to enter a 2000-foot pattern altitude, which is automatically updated on the display. Since pattern altitudes are typically referenced to a distance above ground level (AGL), whereas the pilot is flying at an altitude above mean sea level (MSL), the keypad allows entry in AGL values and automatically converts to MSL for the display. It should be noted the default pattern can be varied based on the type of aircraft and other aircraft location and movement factors.

Figure 13:
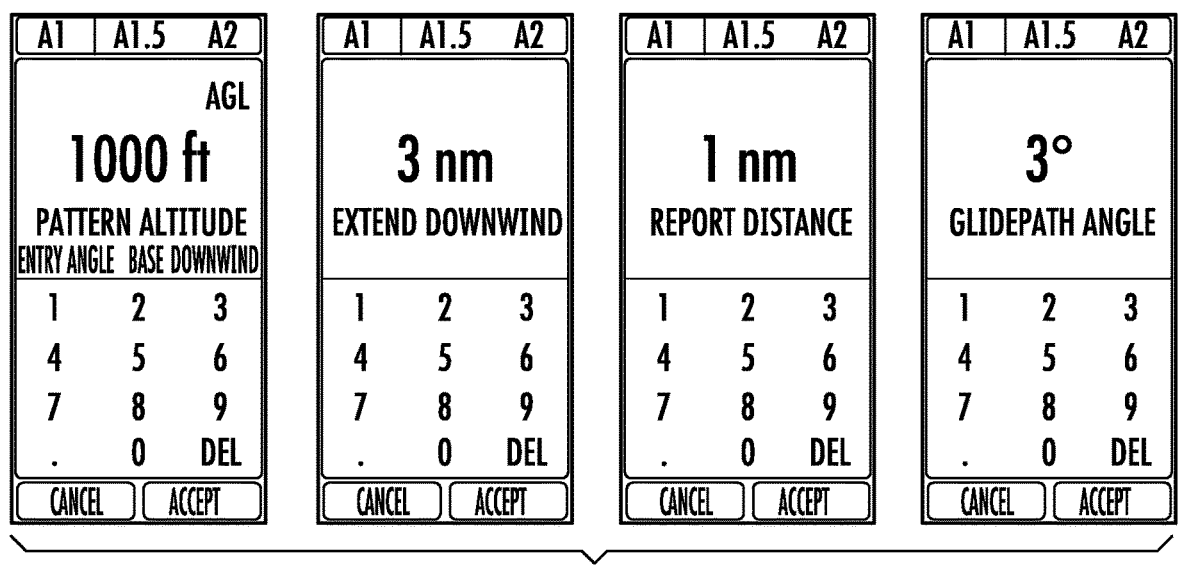
FIG. 13 is a view of alternate keypad setups based on different circumstances.

To further facilitate timely data entry, the keypad selections are preferably dynamically updated based on the current circumstances—as the types of default values a user is likely to want to change will vary based on factors like the type of approach selected and where the user is in the approach. Referring to FIG. 13, different keypad configurations suited to different circumstances are shown. The first keypad from the left will be displayed prior to entering the pattern where a downwind-to-base approach is selected. The second keypad will be displayed when the aircraft is on the downwind leg, allowing quick extension of the distance thereof. The third keypad will be displayed when one of the direct-to approaches (direct-to-base or direct-to-final) is selected, allowing quick customization of the report distance. The fourth keypad (last keypad on the right) can be displayed on the base leg, allowing the user to change the glide path angle for landing.

Figure 14:
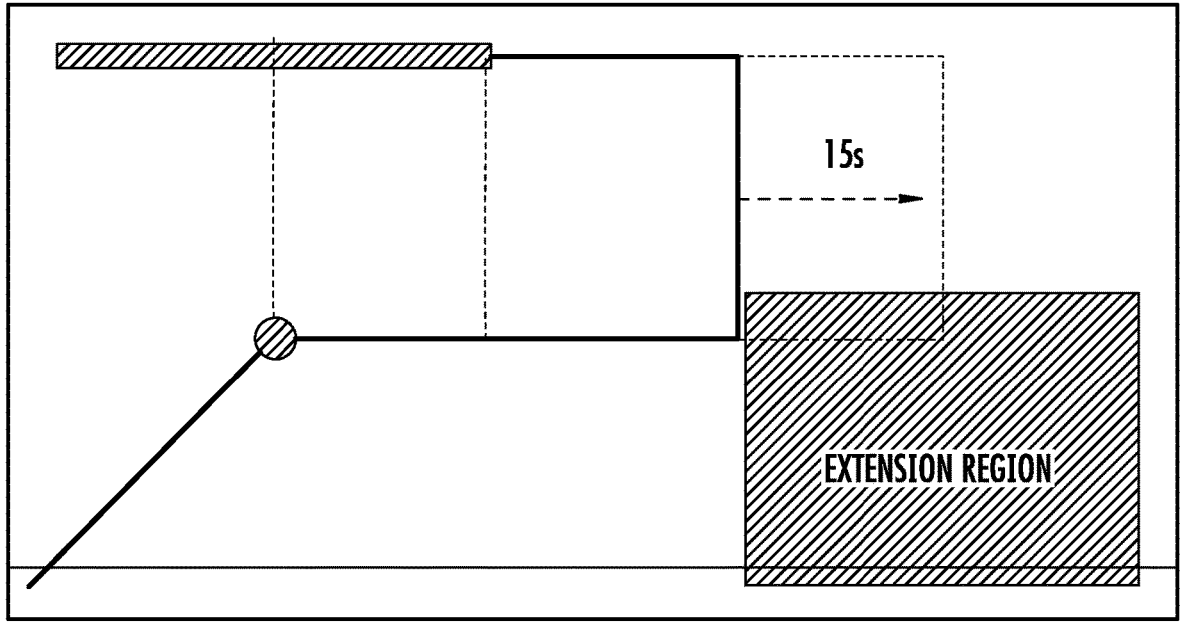
FIG. 14 is a schematic overview of an automatic downwind extension of a displayed approach.

The GUI system 100 allow for keypad adaptation for circumstances by monitoring the location of the aircraft and designating regions around the various portions of a designated approach. This also permits other automatic adaptations of the depicted approach. For example, referring to FIG. 14, when it is determined that an aircraft has not turned onto the base leg at the original end of the downwind leg, the downwind leg is automatically extended, with the remainder of the approach updated accordingly (i.e., the base leg is moved to the end of the new downwind leg and the final leg is lengthened commensurately). Preferably, the adjustment is made based on aircraft speed to give, for each automatic extension, another 15 seconds of flight before the new base leg is reached.

Figure 15:
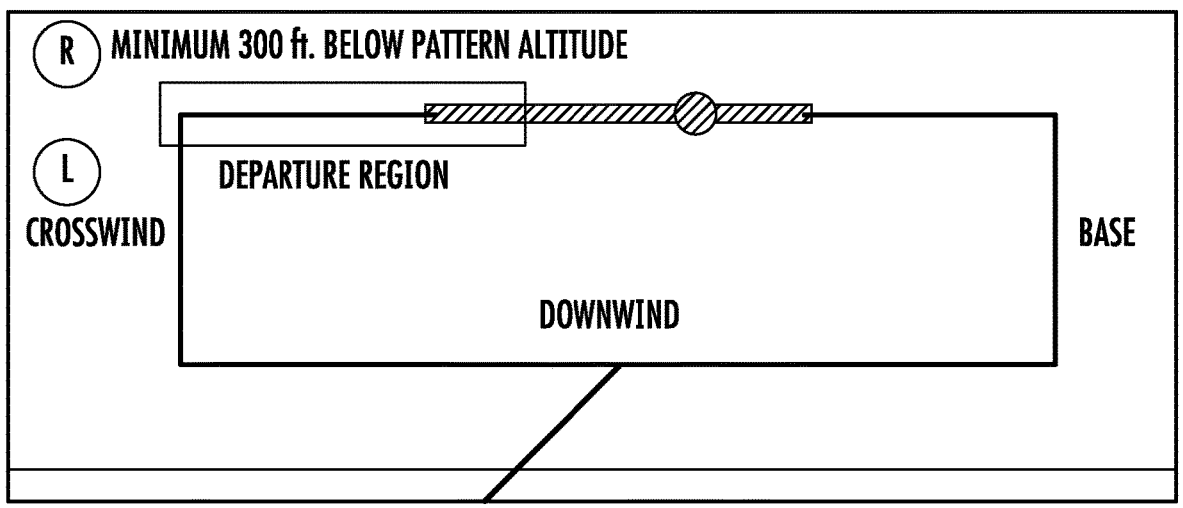
FIG. 15 is a schematic overview of an automatic display update attendant upon a go around or rejected landing.

Similarly, referring to FIG. 15, if an aircraft is detected entering a departure region (preferably at least 300 feet below pattern altitude), the depicted pattern is updated with the automatic display of a departure leg and a crosswind leg to return the aircraft to the downwind leg for another attempted landing. When a straight-in approach is selected, such that the downwind side of the runway is not previously designated, right and left (R and L) indicators can also be generated automatically, allowing the user to indicate quickly which side of the runway the go-around pattern should be generated.

Figure 16:
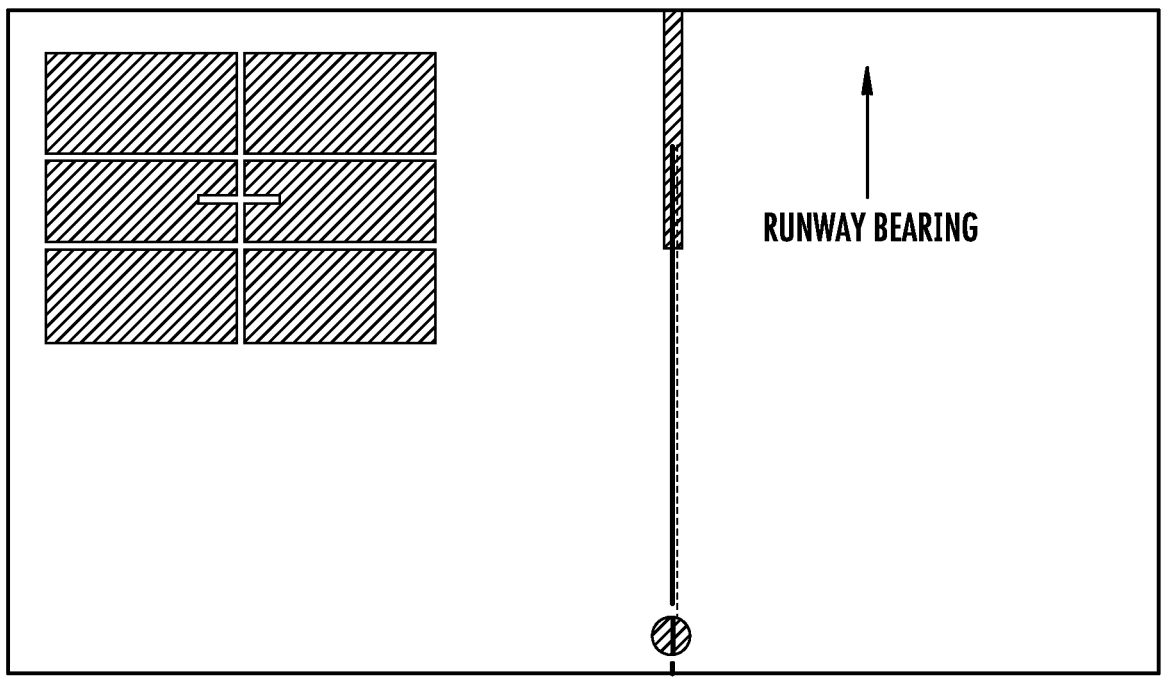
FIGS. 16-18 are schematic overviews of a glide path guidance indicator, under different aircraft conditions.
Figure 17:
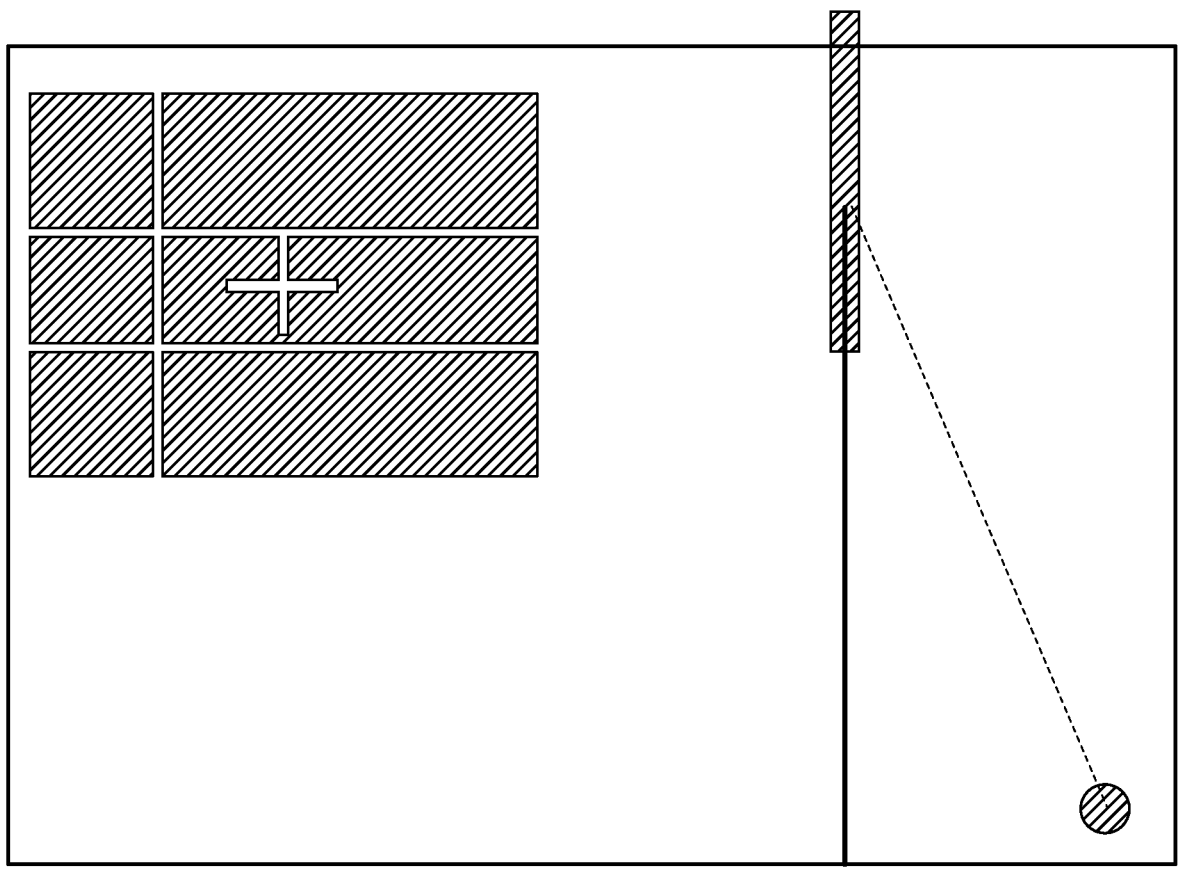
Figure 18:
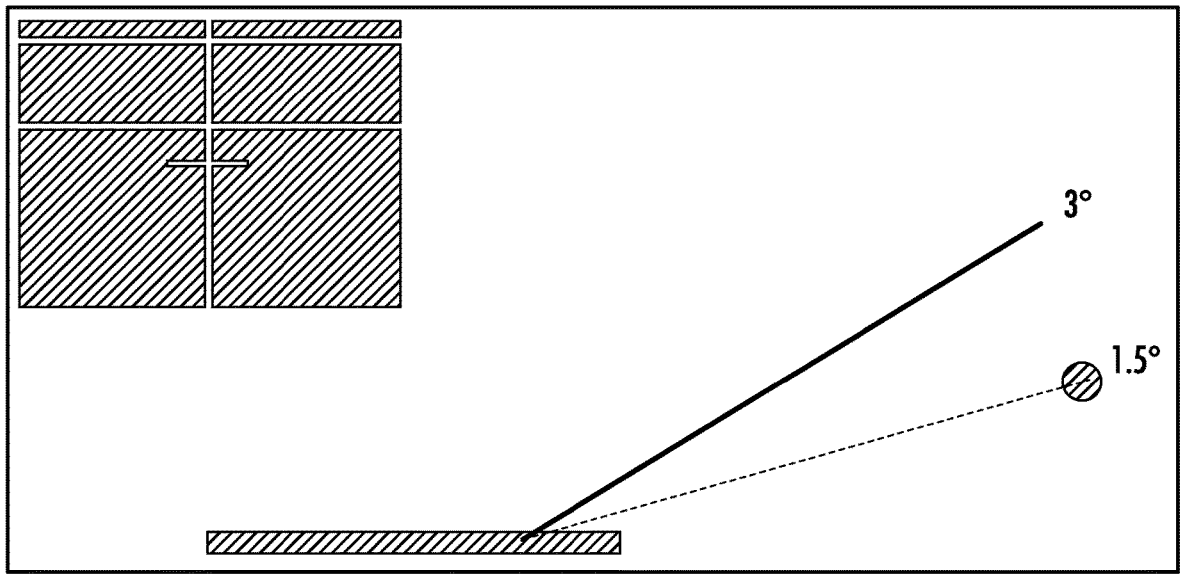

When an aircraft reaches the base leg (or predetermined distance out on direct-to-final and straight-in approaches), a region monitoring function will automatically trigger the display of a glide path guidance indicator. Referring to FIGS. 16-18, a guidance indicator visually indicates whether the aircraft is above or below the glide path. In FIG. 18, the crosshair is centered on the vertical centerline, meaning the aircraft is horizontally on the glide path, and also centered between the two horizontal lines, meaning the aircraft is vertically on the glide path. In FIG. 17, the guidance indicator shows the aircraft vertically on the glide path, but horizontally to the right of the glide path. In FIG. 18, the guidance indicator shows the aircraft horizontally on the glide path but vertically below it. A manual change of glide path will automatically change the display to the new glide path.

In a straight-in approach, an aircraft simply approaches along the bearing of the runway from some predetermined distance away from the runway, beginning its descent at an appropriate point along that long leg. Often, in part to allow better visualization of traffic conditions prior to landing, a VFR approach begins with the aircraft entering—a predetermined entry point—a downwind leg parallel with the runway and final leg, passing the end of the of the runway on the downwind leg by a predetermined distance and turning 90 degrees onto a base leg perpendicular with the downwind leg. The base leg terminates at its intersection with the final leg, with the aircraft turning another 90 degrees onto the final leg and descending for a landing. Other VFR approaches include direct-to-final and direct-to-base, with the aircraft entering the pattern by turning onto final and base legs, respectively, at a predetermined report distance from the respective end thereof.

Preferred parameters of approaches are set by official guidelines. Therefore, a theoretical possibility is to plot and follow an approach using conventional computer-based means—for example, plotting GPS waypoints at each turn. However, this type of user interface will be impractical and largely useless in a real-world situation. For instance, the location and direction of downwind and base legs relative to the runway will vary with wind direction, which may not be known with certainty until the aircraft is already in the vicinity of the airfield. Additionally, even the simplest single airstrip landing site features two runways (i.e., on reciprocal headings of the landing strip), while many airfields feature multiple, often intersecting strips. The active runway will again vary with many factors, and these might not be known sufficiently far in advance to allow a user to plot all the necessary points. Moreover, the three-dimensional aspects of an approach (i.e., required changes in altitude) could not readily be facilitated using such means.

In addition to the inherent variability of standard VFR patterns, local requirements and exigent circumstances may require deviations from the standard patterns. For example, after an aborted landing, the aircraft will need to be piloted through departure and crosswind legs before returning to the downwind leg to re-attempt the landing. As another example, in the presence of traffic in the pattern, it may be necessary for the downwind leg to be extended. Simply steering back to a previously plotted waypoint could be disastrous in these circumstances.

Figure 19:
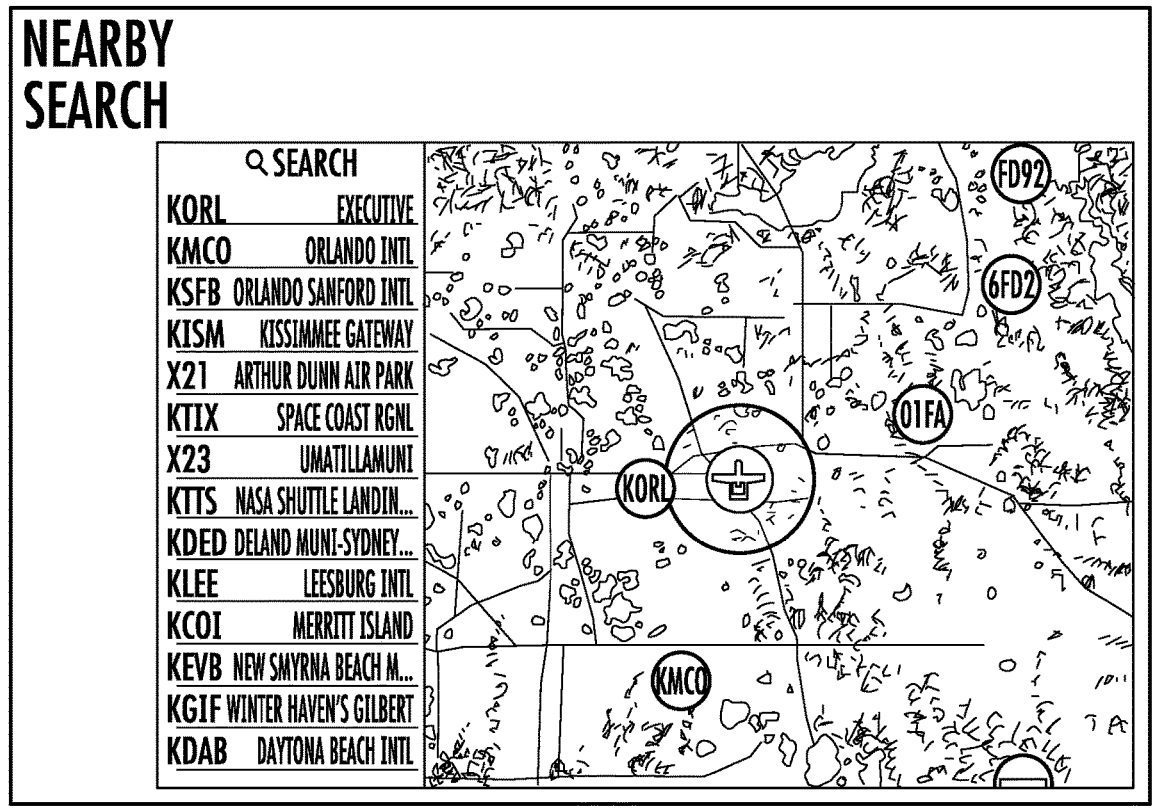
FIG. 19 is a screen view of an airfield search/selection screen.

The system and method of the present invention offer various methods for airfield selection. For example, referring to FIG. 19 all airfields within a predetermined or selected vicinity of the aircraft can be displayed, both in list form and as selection indicators on a map or chart. This display will preferably be updated periodically in response to aircraft movement. Advantageously, different colored indicators can be used to distinguish between different types of airfields (e.g., public, private, military, helicopter, sea plane base). The user can preferably pan and zoom the map or chart to display more, fewer, or different airfields. Upon selecting a desired airfield from the map or list, a view like FIG. 8 is displayed for the selected airfield.

Alternately, a text entry search for airfields could be performed based on various criteria (e.g., city and state, airfield designator, and airfield name). The search can advantageously filter results based on characters entered. For example, if the search text includes a comma, the results can be filtered based on city and state (if at least two terms separated by a comma) or city (if only one term). If the search text does not include a comma, and no characters are entered, then the most recent set of nearby airfields is indicated. If one to two characters are entered, then results are filtered by state. If three to four characters are entered, then the results can be filtered by airfield designator, and if more than four characters are entered the results can be filtered by airfield name and/or city. This type of search interface leverages unique aspects of airfield data to allow a database to be more effectively filtered and yield relevant results more quickly.

For any selected airfield, the present invention can immediately calculate all of the necessary information to generate the above-described interface, simply from having at least one three-dimensional coordinate and defined length vector(s) therefrom for each landing strip [e.g., a latitude, longitude and altitude relative to MSL, and a length and bearing (and, if applicable, altitude change) of the runway therefrom]. A user can also manually enter such information for an airfield, if not already in a database accessible by the system/method, at which point all of the above functionality is immediately available for the newly-defined airfield. For example, for a processing unit in signal communication with the database and the display screen, the processing unit can be configured to receive aircraft location and movement information and determine the displayed content and format of the content based on the user input, aircraft location and movement information, and associated airfields information retrieved from the database.

Figure 20:
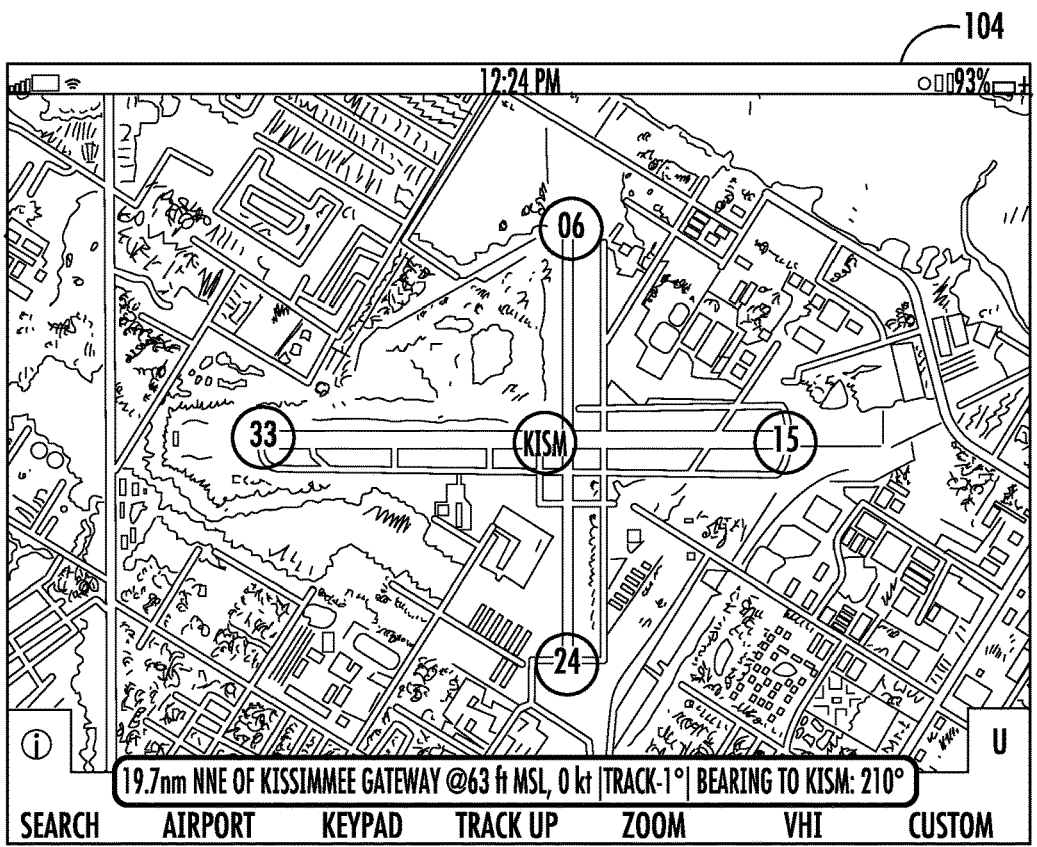
FIG. 20 is a screen view after approach selection, incorporating communications facilitation features.

Referring to FIG. 20, the system and method of the present invention can further advantageously include consistent updating of relevant communications information and display of this information in a readable format. As the aircraft proceeds through the approach, the displayed information and, as applicable, format will be updated automatically. For non-standard approaches, more general information can still be provided, such as range and bearing to the airfield, along with altitude and speed.

Figure 21:
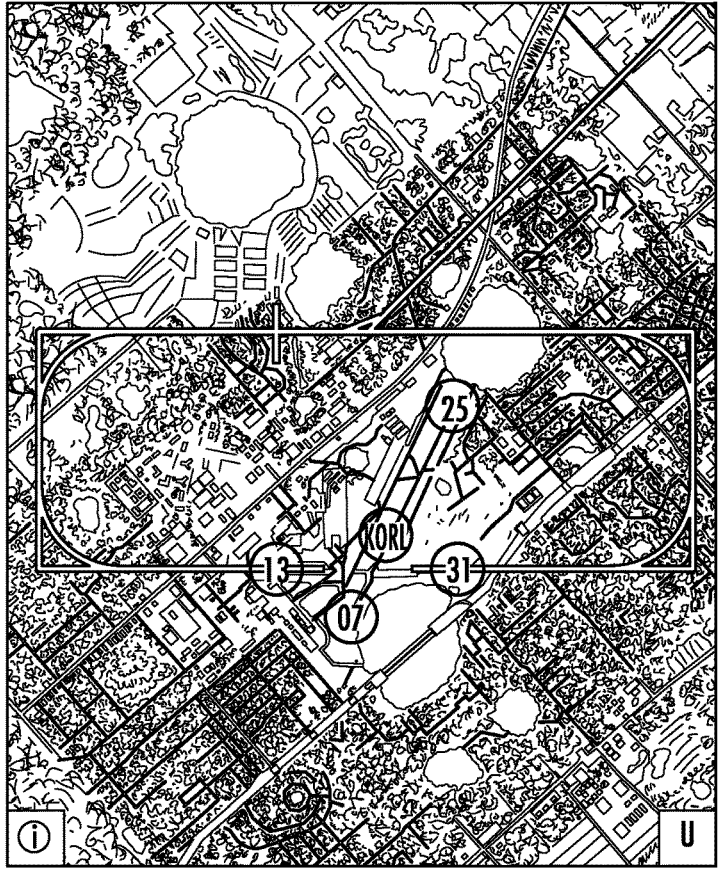
FIG. 21 is a screen view showing turning radius of a selected approach pattern.

Referring to FIG. 21, the system and method of the present invention are configured to calculate and draw an arc wherever the plane may perform a banked turn, such as on entry to the arrival leg, downwind leg, base, final, departure, crosswind, and the like. For example, the arcs in FIG. 21 were calculated for the performance characteristics of an aircraft traveling at 70-90 knots and 16-25 degrees of bank at one mile and 3-6 degrees per second turn rate. The turn radius increases with the size of the pattern to support larger and faster planes. The ratio for arcs within a pattern equates to ¼ of the length of base to support level flight on base and crosswind. The arcs can be calculated and drawn dynamically based on a combination of velocity, bank angle, rate of turn, and turn radius. As an example, turn radius is calculated as velocity$^2$/(11.26*tan (bank angle)) and rate of turn equals to 1091*tan(bank angle)/velocity in knots.

Figure 22:
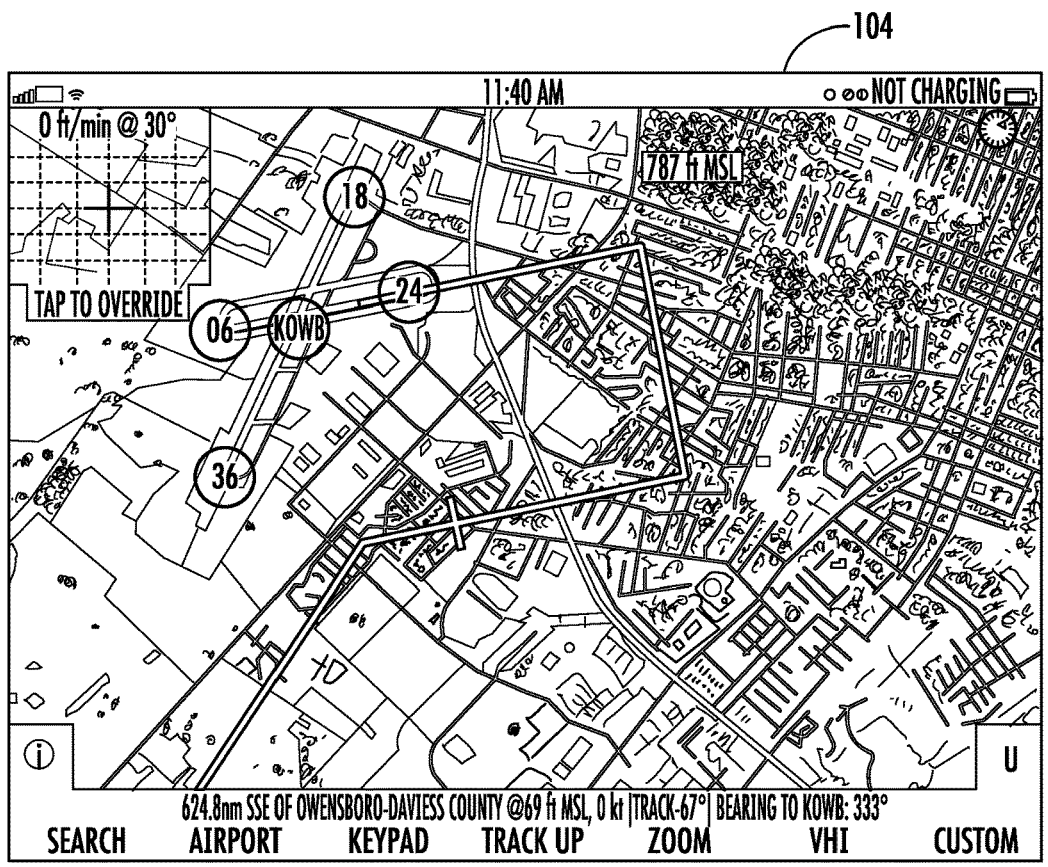
FIGS. 22-25 are screen views of an overhead graphical view including a vertical horizontal indicator (VHI) indicator and associated keypads, according to another embodiment of the present invention.
Figure 23:
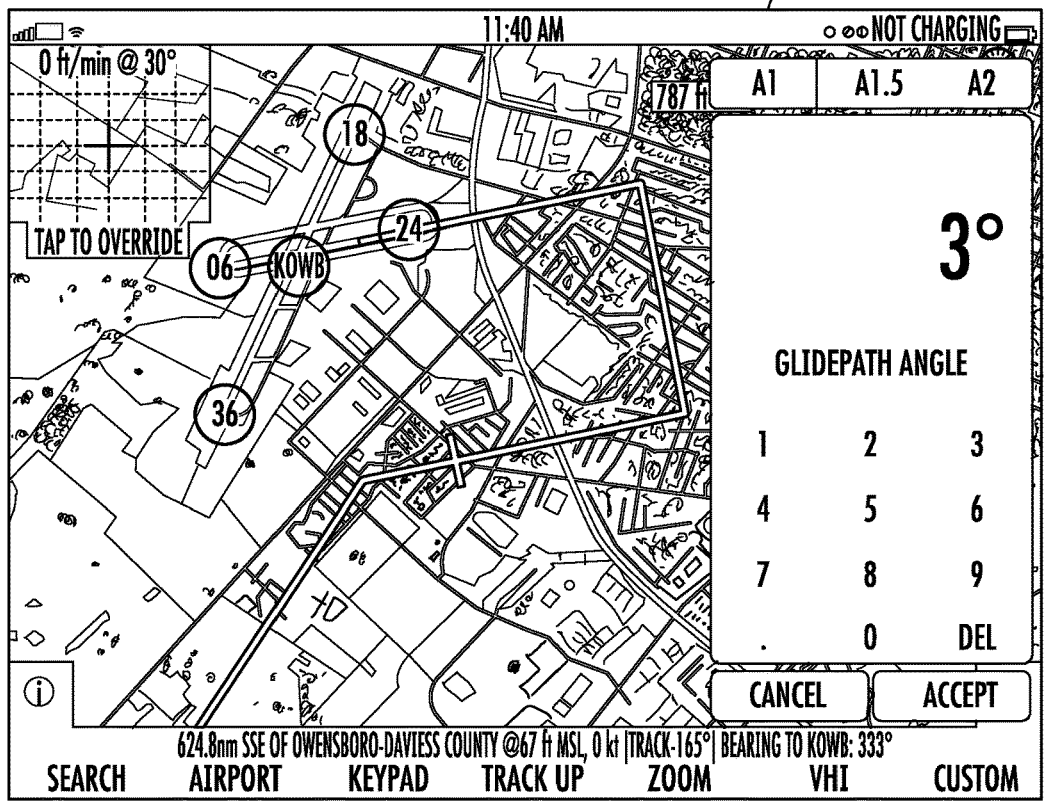
Figure 24:
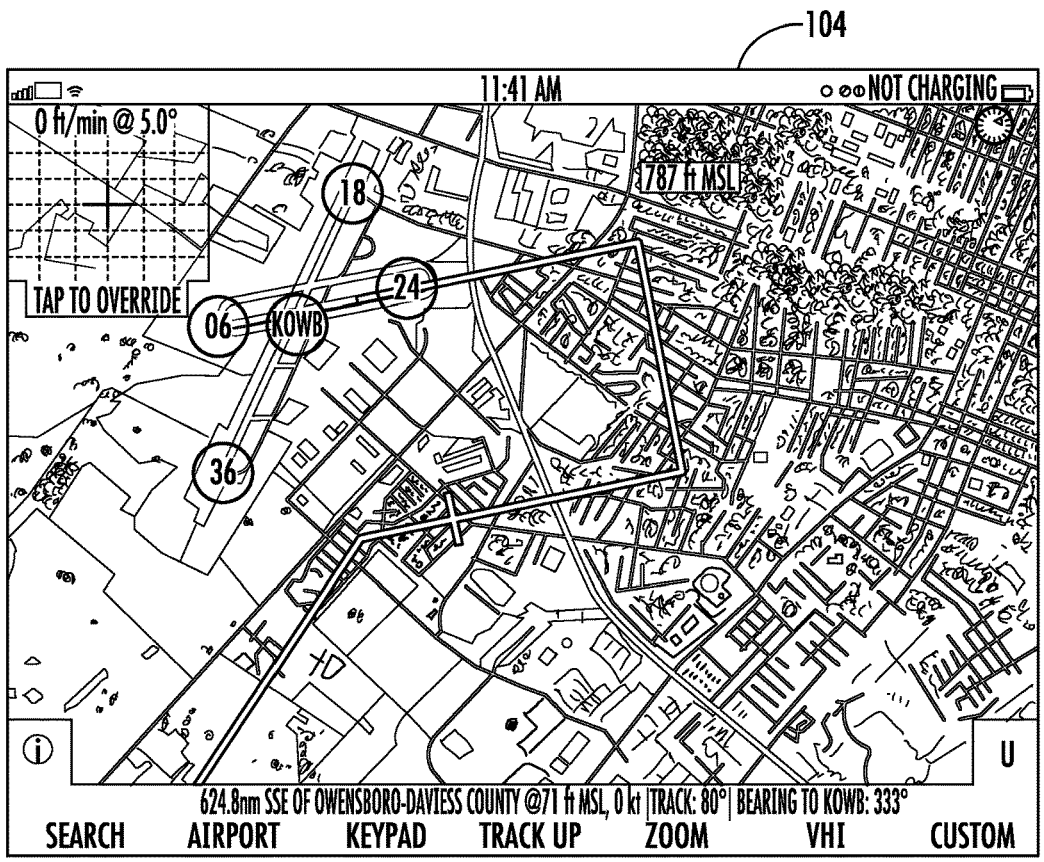

Referring to FIG. 22, the display screen 104 of the present invention can further display a vertical-horizontal indicator (VHI) or glide path indicator in the upper left corner of the display screen to allow a user to fly a constant heading and slope onto the selected runway. The VHI shows the slope and the corresponding rate of descent (ROD) an aircraft should follow. The VHI allows a user to fly a constant slope onto the selected runway through moving vertical and horizontal bars (see white bars at the upper and left-hand sides of the VHI). Tapping the VHI allows a pilot to change the slope value. For example, referring to FIG. 23, tapping the VHI will cause a keypad to appear automatically. The user can change the slope value. Referring to FIG. 24, the new slope value is confirmed in the VHI on the upper left corner of the display screen.

Figure 25:
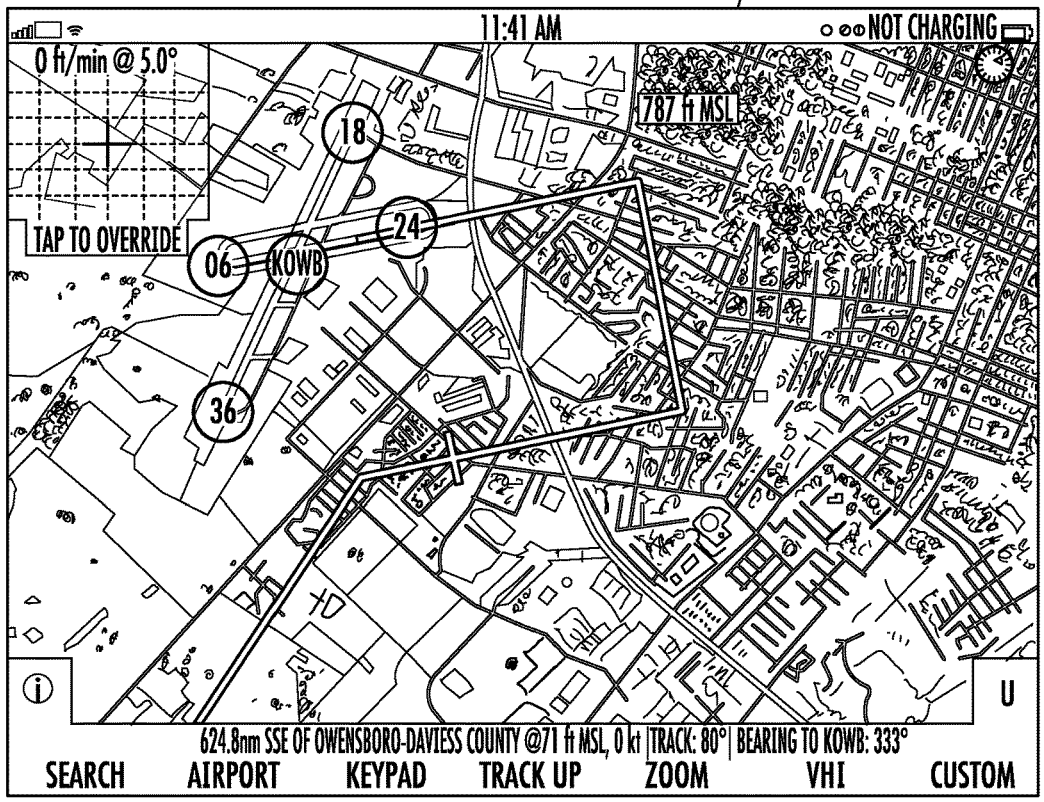

The system has the ability to input information to define a specified area as landing runway and generate a suitable approach pattern associated with the custom created runway. For example, referring to FIG. 25, a private runway is shown but the airfield has no published approach patterns. A user can create a suitable approach pattern using the user interface of the system. Specifically, when a user taps a "Custom" button, the system will display a manual entry box on the screen to allow the user to create a suitable approach pattern to the private runway. Specifically, the system will compute an upwind leg, a crosswind leg, a downwind leg, a base leg, and final approach based on the aircraft location and runway location. The system can compute one or more approach patterns suitable for any landing area.

Figure 26:
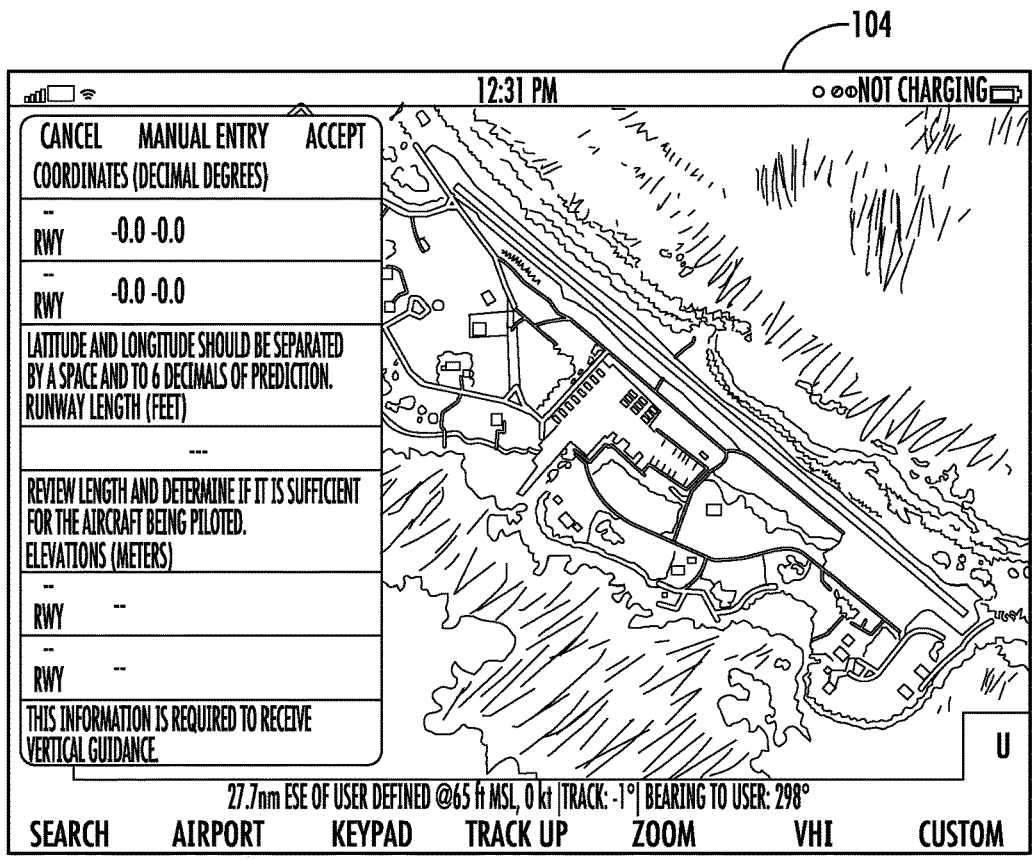
FIGS. 26-27 illustrate a screen view of a landing site creation for a selected runway.
Figure 27:
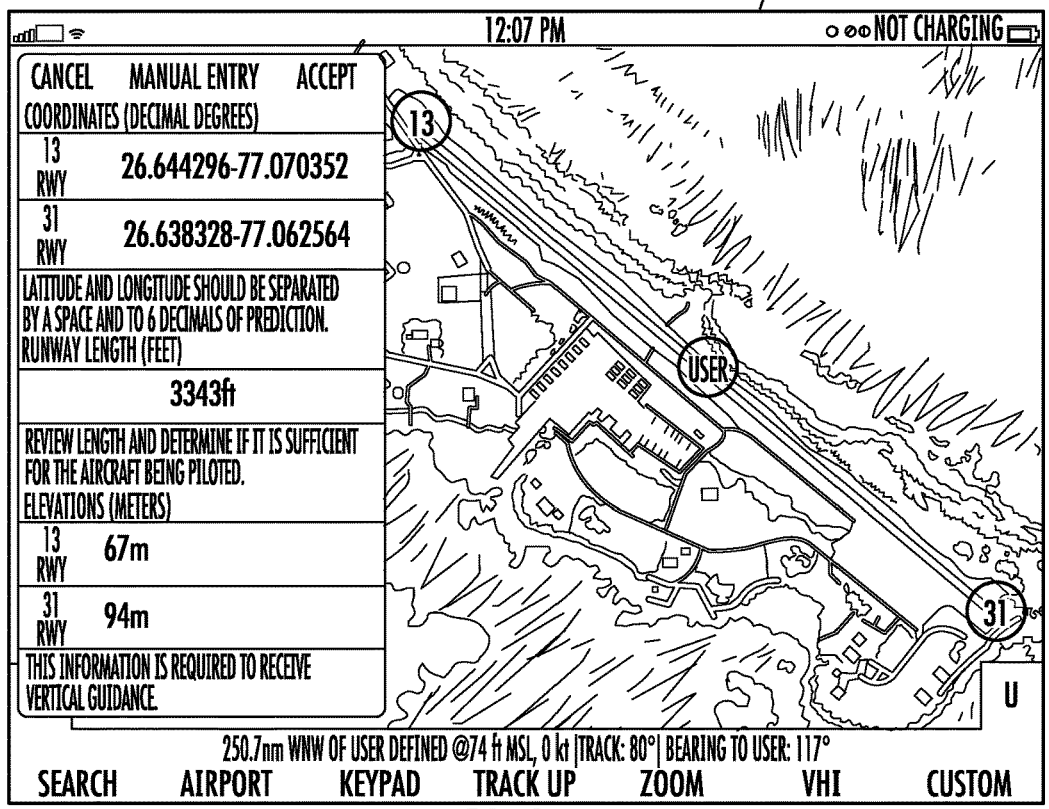

Referring to FIG. 26, as an example, a user taps at both ends of a selected runway or enters the latitude and longitude for both ends of the runway. The system can automatically confirm the creation of the landing site by naming it "user" and assign numbers to the runway, for example, runway 13-31, as shown in FIG. 27. The system is configured to give a user the length of the defined runway, for example, 3343 ft, and the field elevation (MSL) at each end, for example, 67 m and 94 m, as shown in the figure. By comparing both ends, the user can determine that runway 13 will be an uphill landing and runway 31 will be a downhill takeoff. Once the user taps "Accept", the system will create one or more approach patterns for each runway automatically.

Figure 28:
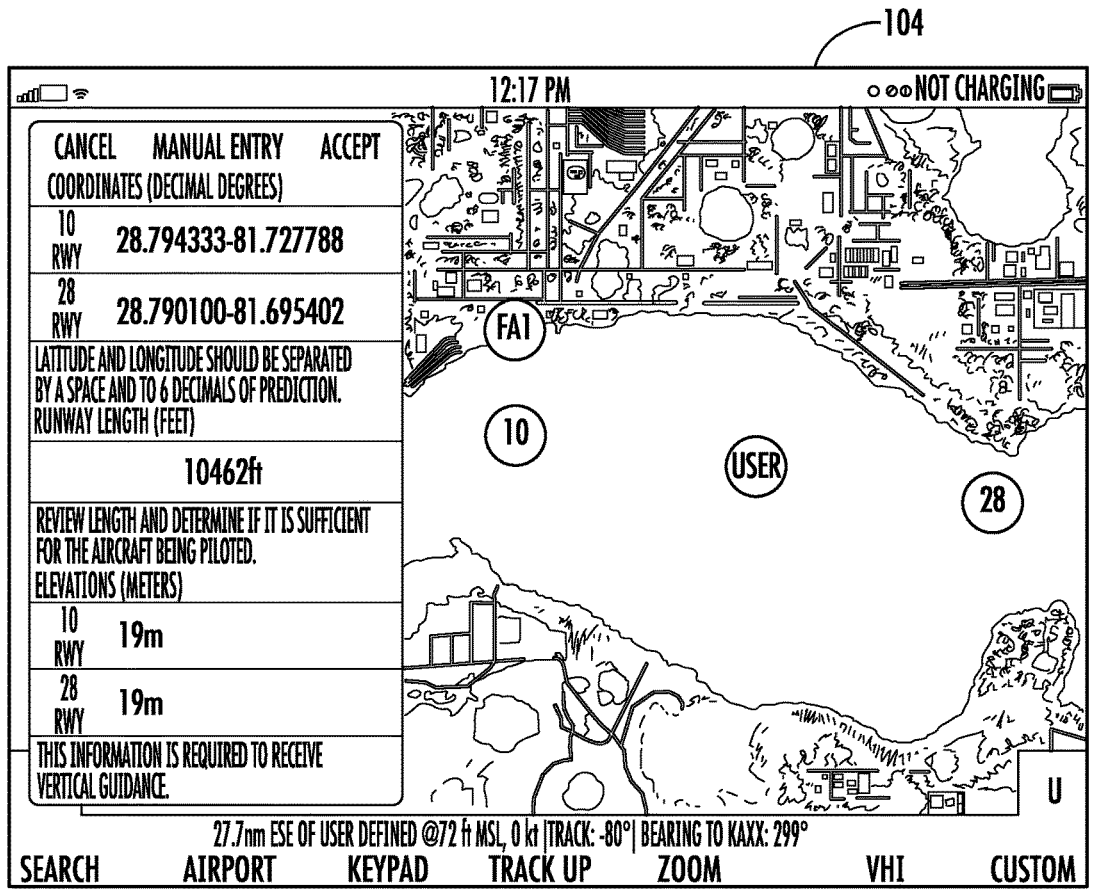
FIG. 28 illustrates a screen view of a landing site creation for a sea plane.

Similarly, referring to FIG. 28, a user can define a landing site for a seaplane by tapping at both ends of a desired lane or region. The system automatically confirms the creation of the lane by naming it "User" and assigning numbers to the defined lane, for example, lane 10-28. The system provides the length of the lane created: 10,462 feet and the elevation (MSL) at each end. Once the user taps "Accept", the system will create all the approaches for each lane automatically.

Figure 29:
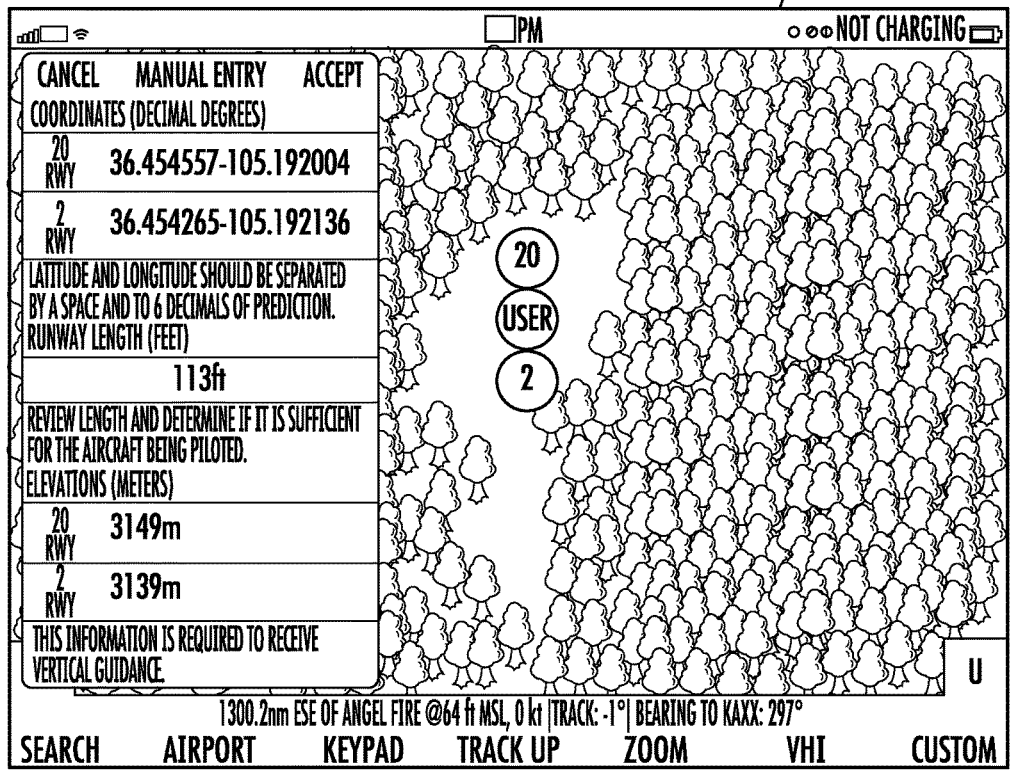
FIGS. 29-32 illustrate an overhead graphical view of various display screen for a helicopter vertical landing.
Figure 30:
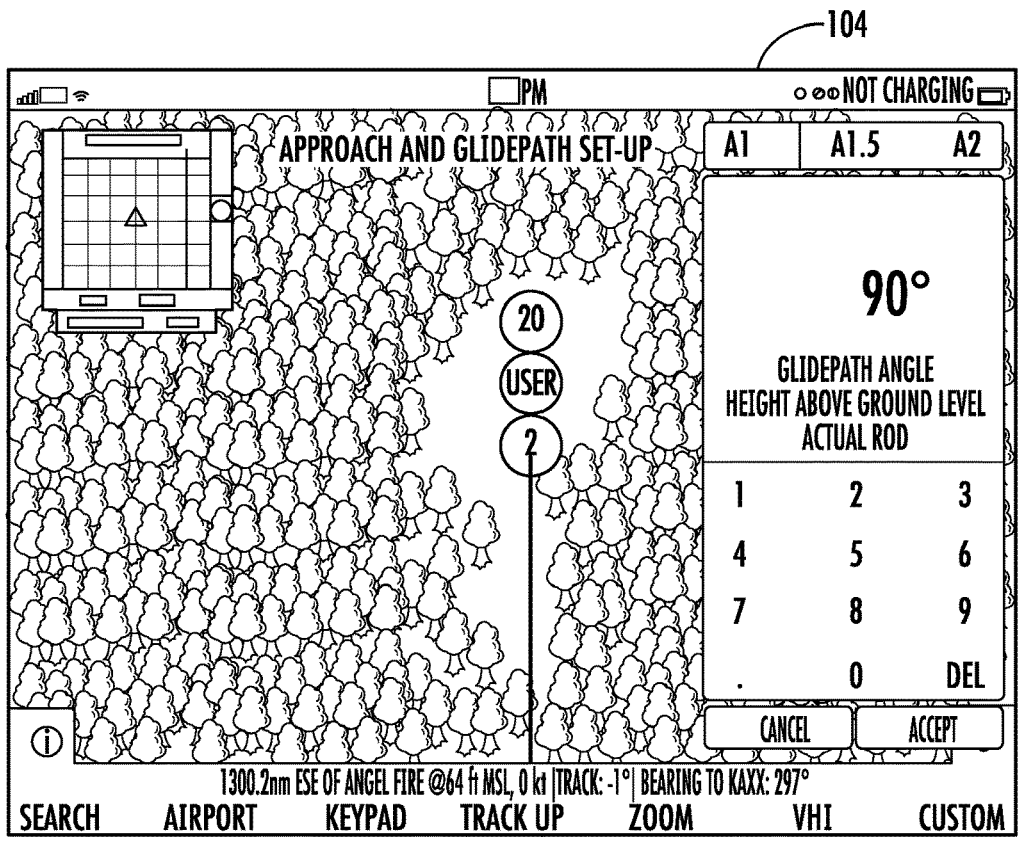
Figure 31:
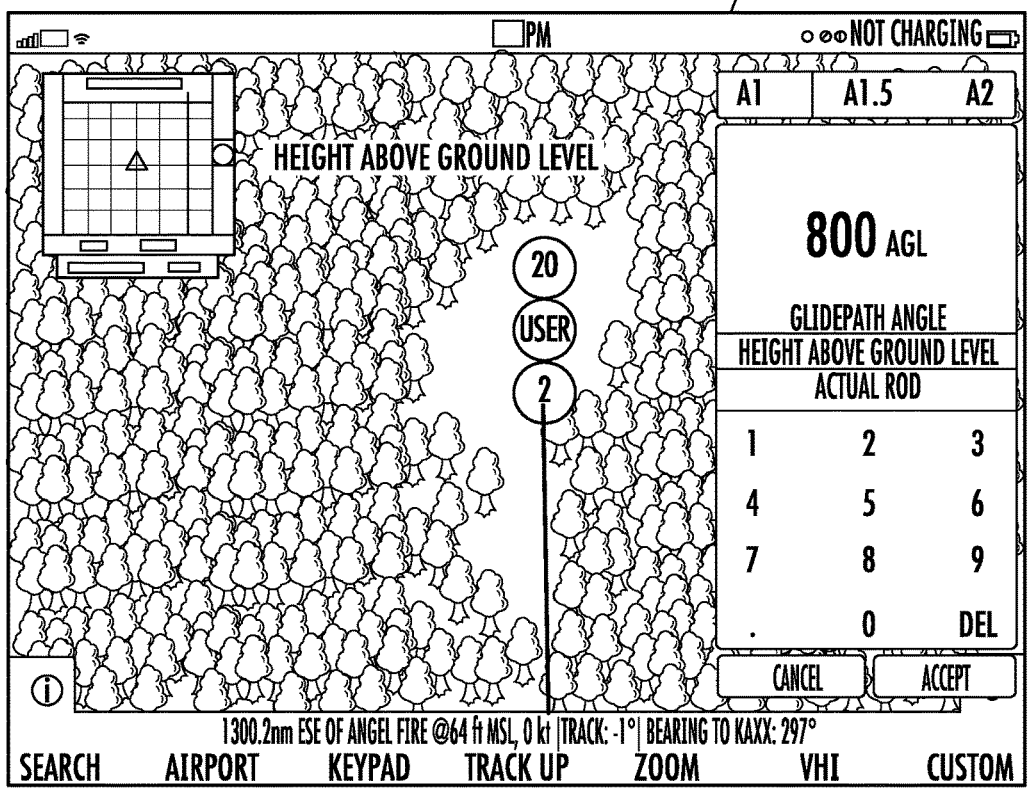
Figure 32:
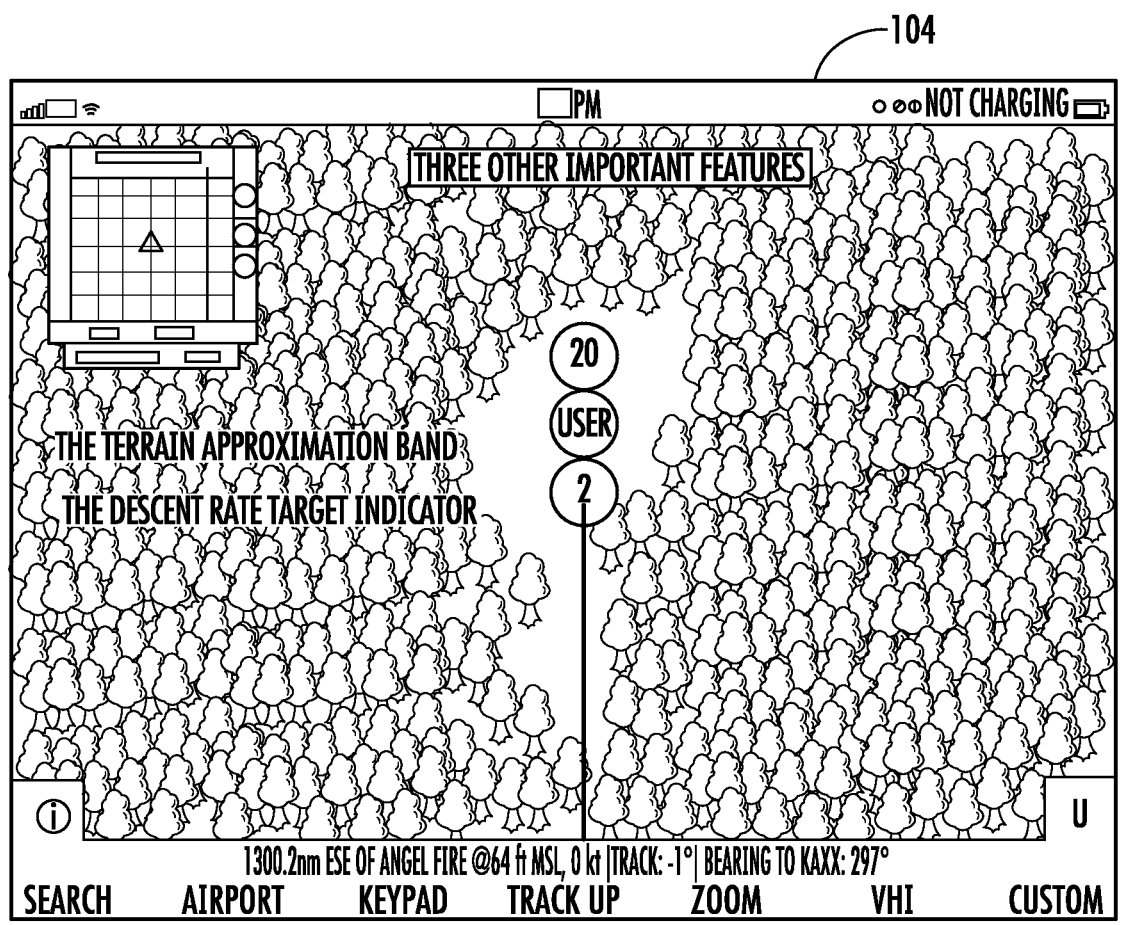

Referring to FIG. 29, a user can also define a landing site and associated landing path for a helicopter. For example, a user can select approach type "90" and "above ground level" (AGI) input keypad appears on the display screen. Referring to FIG. 30, a user inputs "800" feet as AGI. Then a ROD window appears on the display screen and shows "100 ft/min" (FIG. 31). Then a descent rate target indicator is shown on the upper left corner of the display screen, indicating current descent rate in relation to the target descent rate and a terrain approximation band is drawn along descent path (FIG. 32).

Referring to FIGS. 33-45, the display screen can be configured to display a split view of a HUD on the left side and an overhead graphical view on the right side of an airfield to be approached. FIGS. 33-45 are for example only. Other split view arrangements can be used. For example, the HUD view can be on the right side and the overhead graphical view on the left side of the display screen. Or the split view can be split vertically instead of horizontally. For example, the HUD can be on the top of the display screen, and the overhead graphical view on the bottom of the screen. The HUD can also be overlaid on top of the overhead graphical view, just as the overhead graphical view can be overlaid on top of the HUD. Alternatively, the views can be displayed on two separate devices.

The HUD visually indicates the aircraft's position in relation to a planned path (e.g., above, below, to the left, to the right). The aircraft in HUD is indicated by the crosshairs. In the depicted embodiment, the HUD integrates a moving square guidance box in relation to an aircraft. The moving guidance box indicates a real time aircraft position in relation to a planned approach and landing path. When an aircraft is centered between two vertical lines of the square guidance box, it means the aircraft is horizontally located on the approach and/or landing path. When an aircraft is centered between the two horizontal lines of the square guidance box, it means the aircraft is vertically located on the approach and/or landing path.

The overhead graphical view on the right side of the display screen is an aerial or satellite view of an airfield. Other overhead graphical views can be employed, such as standard aviation charts, and airfield information diagrams. In the depicted embodiment, the overhead graphical view on the right side of the display screen includes a selected approach pattern of an airfield (e.g., airfield KORL).

Two square check boxes are shown on the overhead graphical view. These two check boxes are configured to be superimposed automatically on two adjacent crucial points (e.g., turning point, altitude gate) on an approach pattern. Specifically, the crucial points include an altitude gate on an arrival leg, a downwind leg, a base leg, and one or more turning points there between. An altitude gate represents the point at which the aircraft should have descended to a specific altitude, and it is usually drawn at a predetermined distance before an entry point. A descent gate represents a point at which the aircraft should begin descending to an altitude so as to intercept the proper glide path on the final approach. The descent gate is usually drawn at a 90-degree angle to the beginning of a runway being approached. When an aircraft reaches the final approach, a glide path intercept gate is advantageously also displayed prior to actual interception of a glide path altitude.

Figure 33:
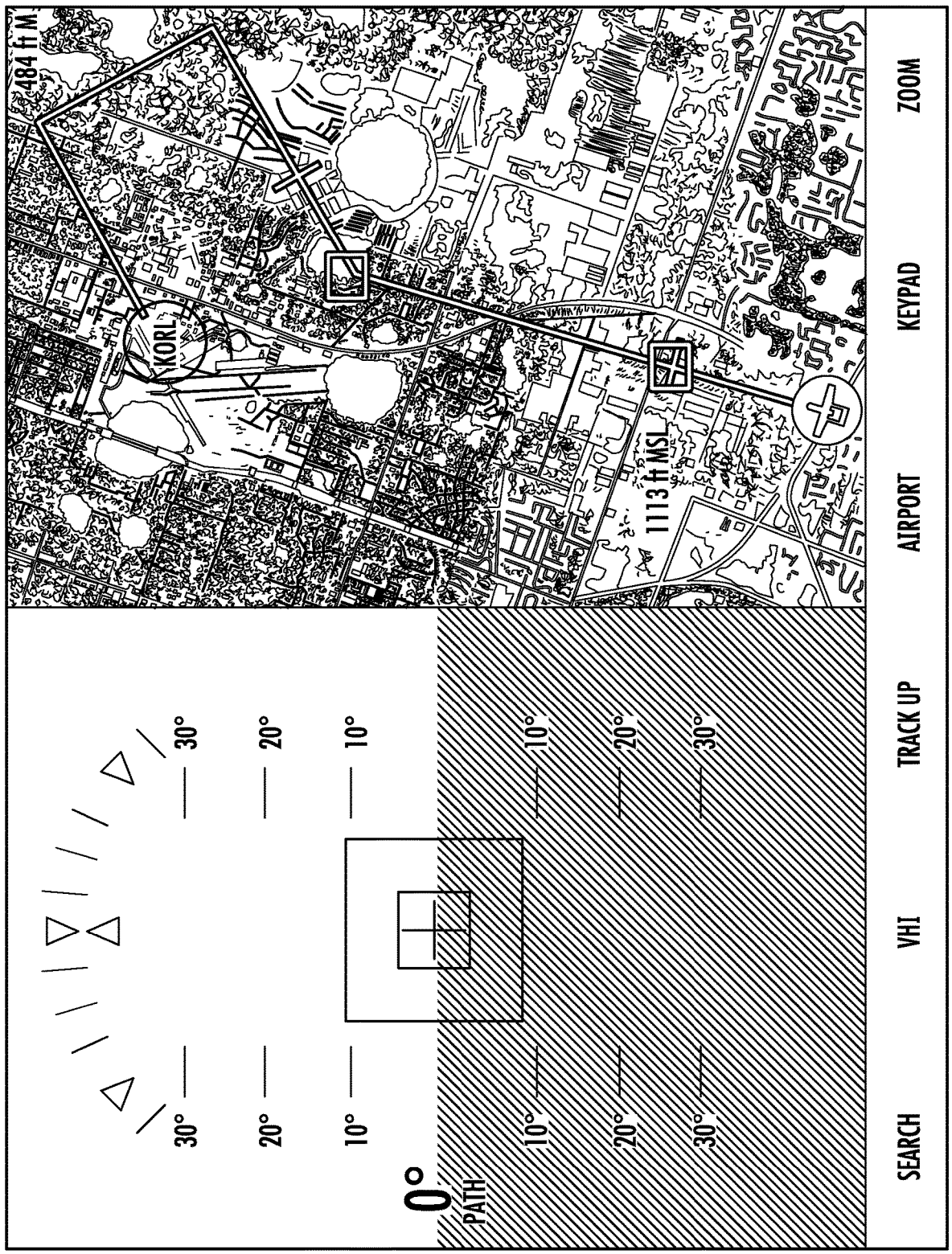
FIGS. 33-46 are split screen views of a head-up display on the left side and a corresponding overhead graphical view on the right side.
Figure 34:
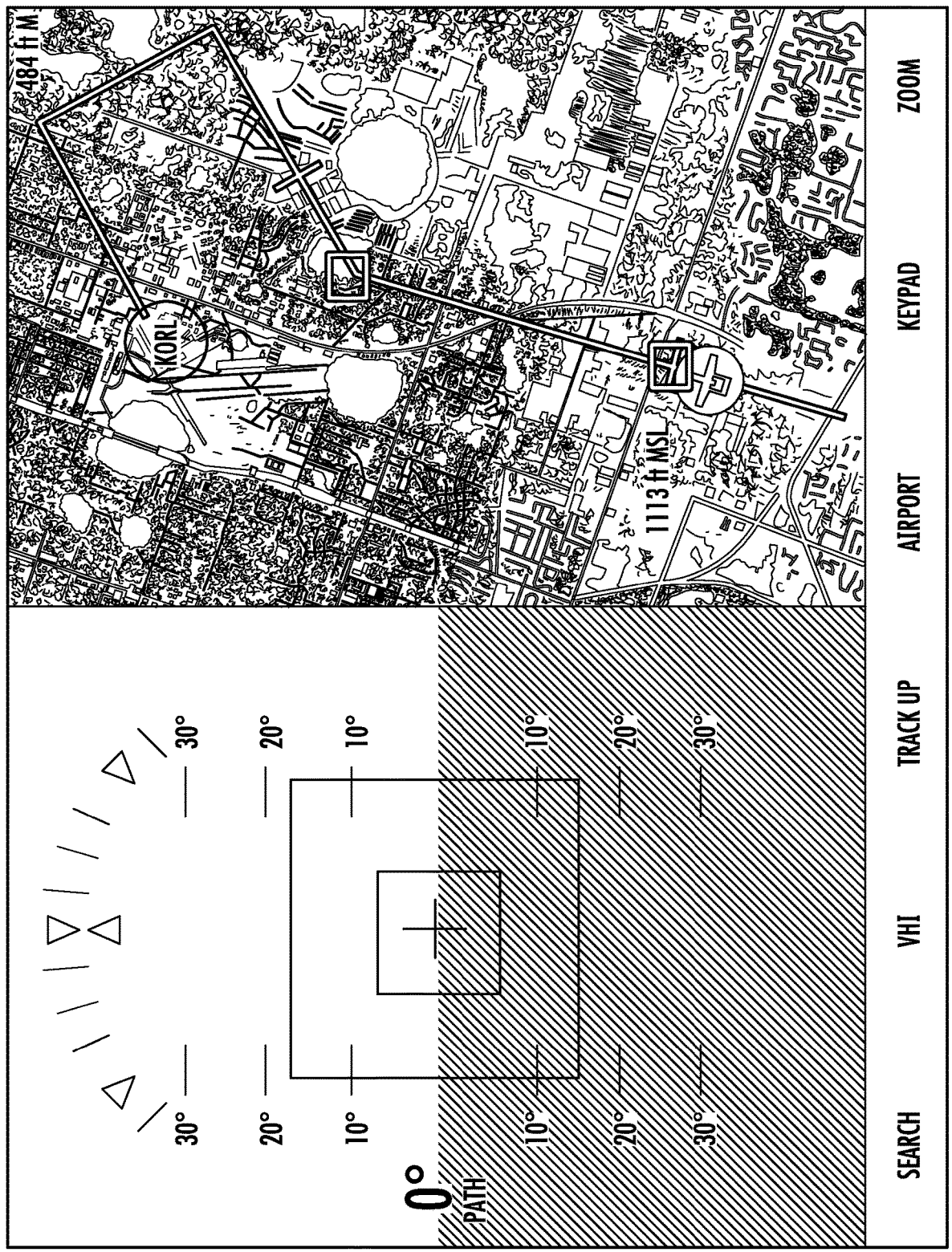

Referring to FIGS. 33-34, as the aircraft is flying on the approach leg, the two check boxes on the overhead graphical view are an altitude gate on the approach leg and a turning point between the approach leg and the downwind leg. At the moment captured in these figures, the corresponding guidance box is located on the center of the HUD display, and the aircraft fits in the center of the guidance box, which indicates that the aircraft is on the planned approach path.

Figure 35:
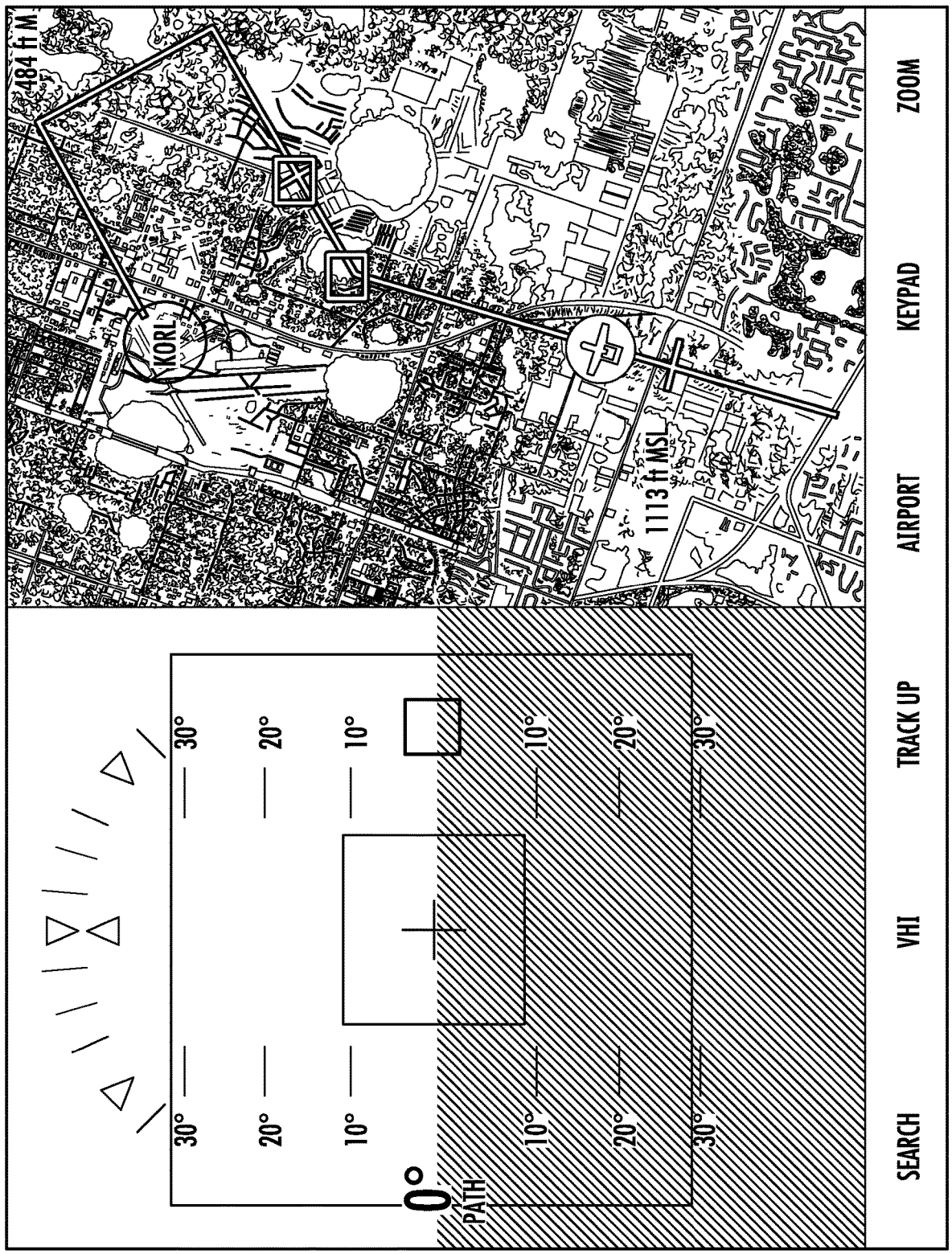
Figure 36:
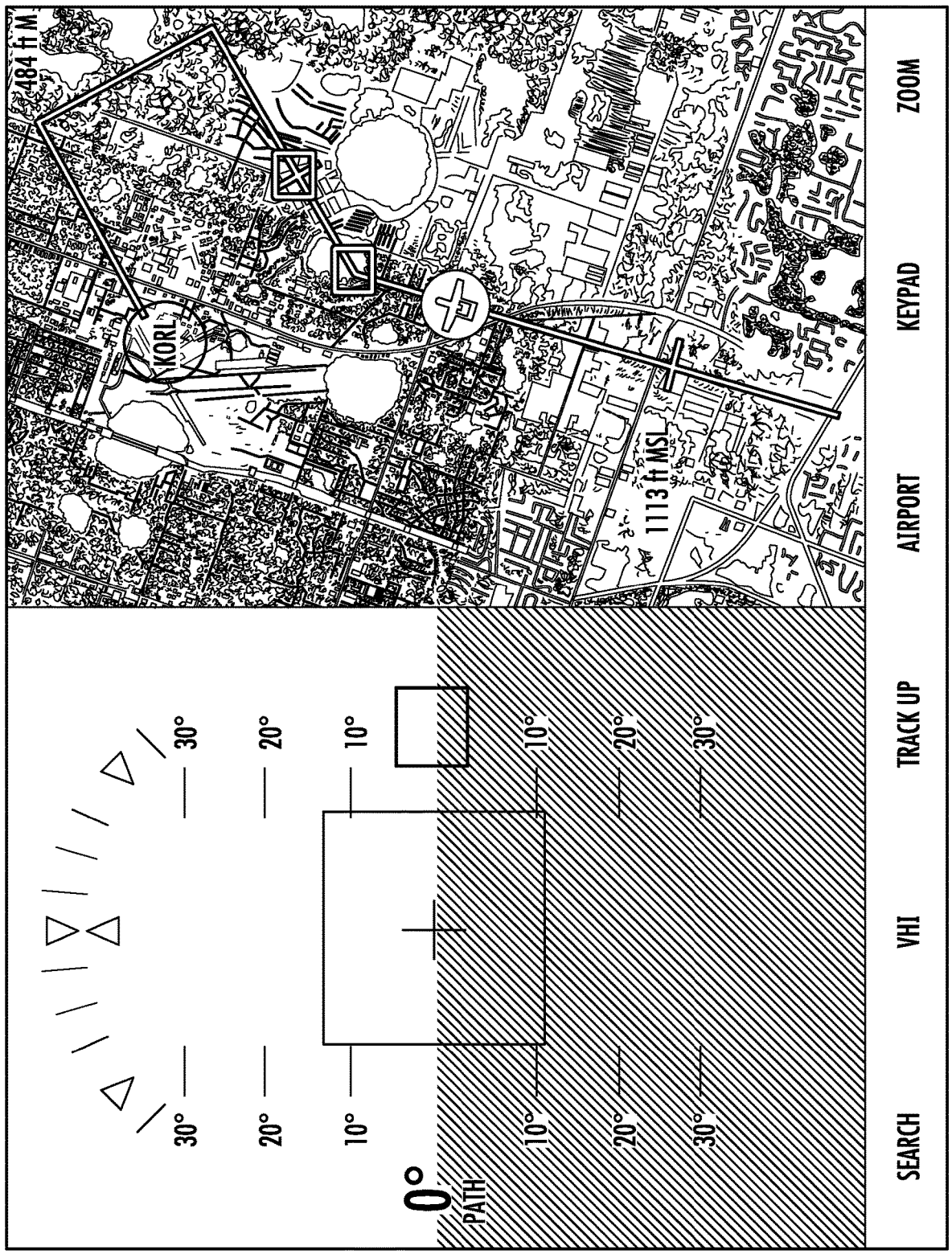

Referring to FIGS. 35-36, as the aircraft flies through the altitude gate on an approach leg, the two check boxes on the overhead graphical view are the turning point between the approach leg and the downwind leg and an altitude gate on the downwind leg. At the moment captured in these figures, HUD shows the guidance box on the right side of the aircraft. A pilot needs to turn right to follow a planned approach and landing path.

Figure 37:
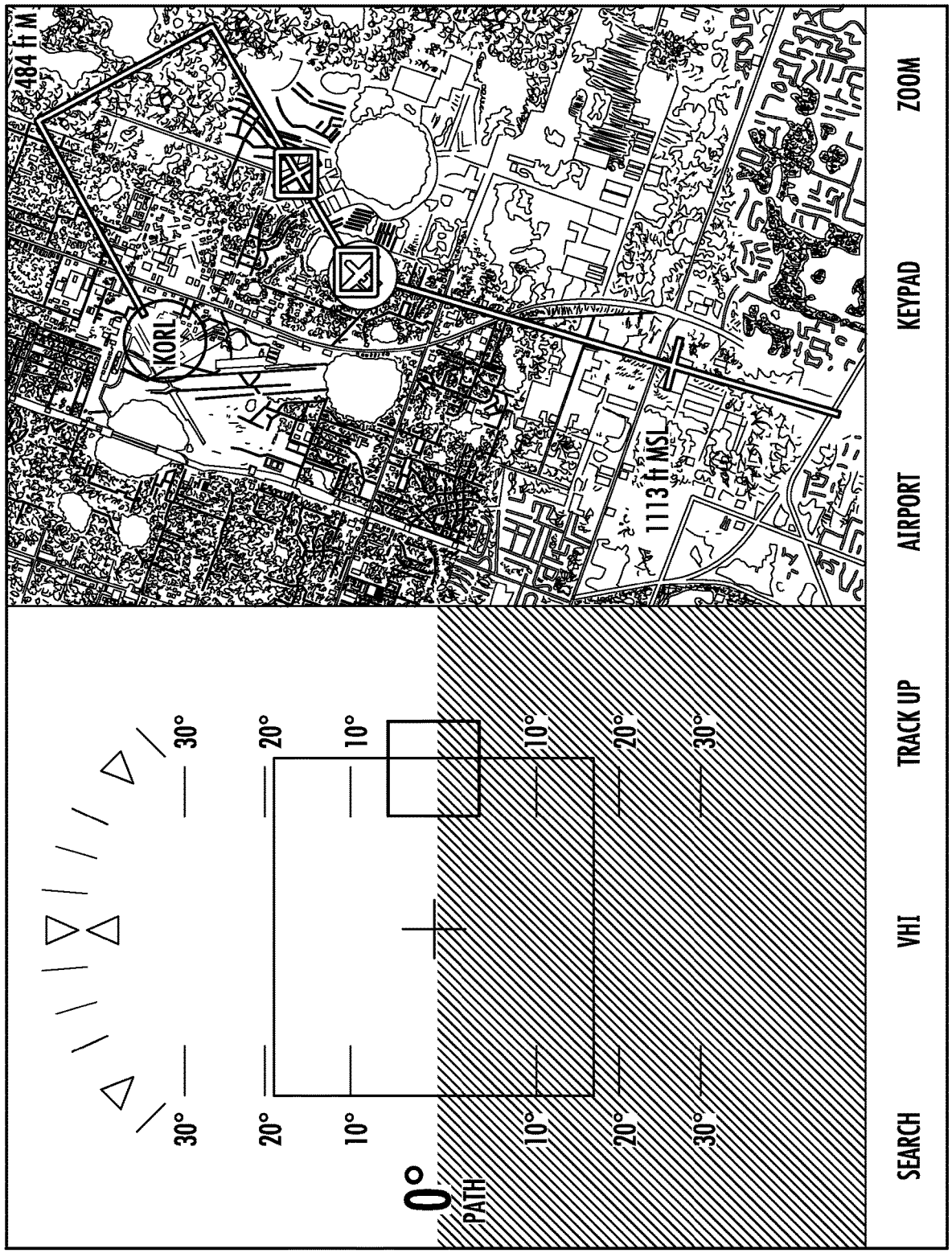

Referring to FIG. 37, as the aircraft passes through the turning point between the approach leg and the downwind leg, HUD shows the guidance box still on the right side of the aircraft, but closer to the center than in FIGS. 35 and 36. This means a pilot still needs to make a minor right turn to follow the planned approach and landing path.

Figure 38:
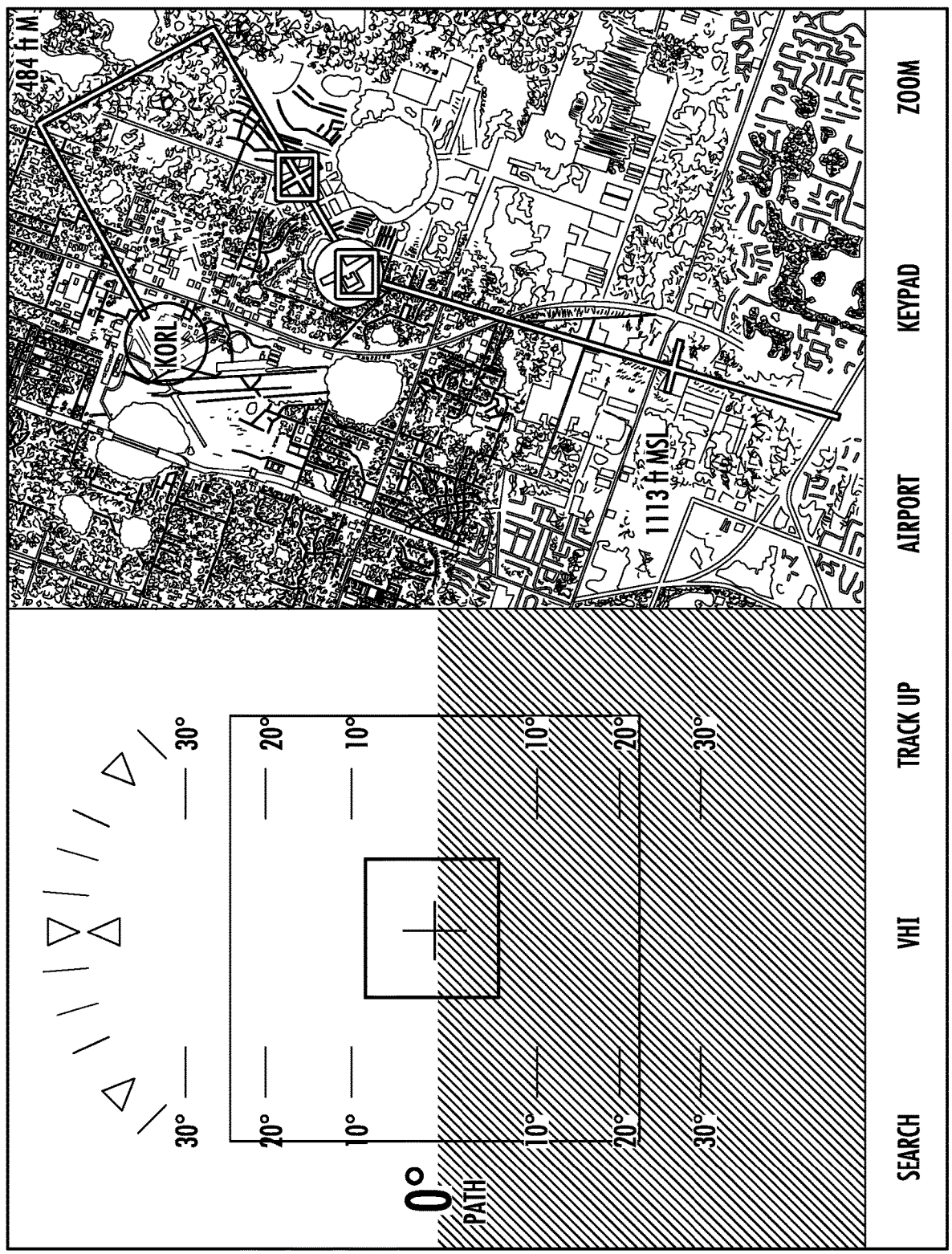

Referring to FIG. 38, when the aircraft passes through the turning point between the approach leg and the downwind leg, HUD shows the aircraft positioned in the center of the guidance box, meaning the aircraft is right on the approach and landing path.

Figure 39:
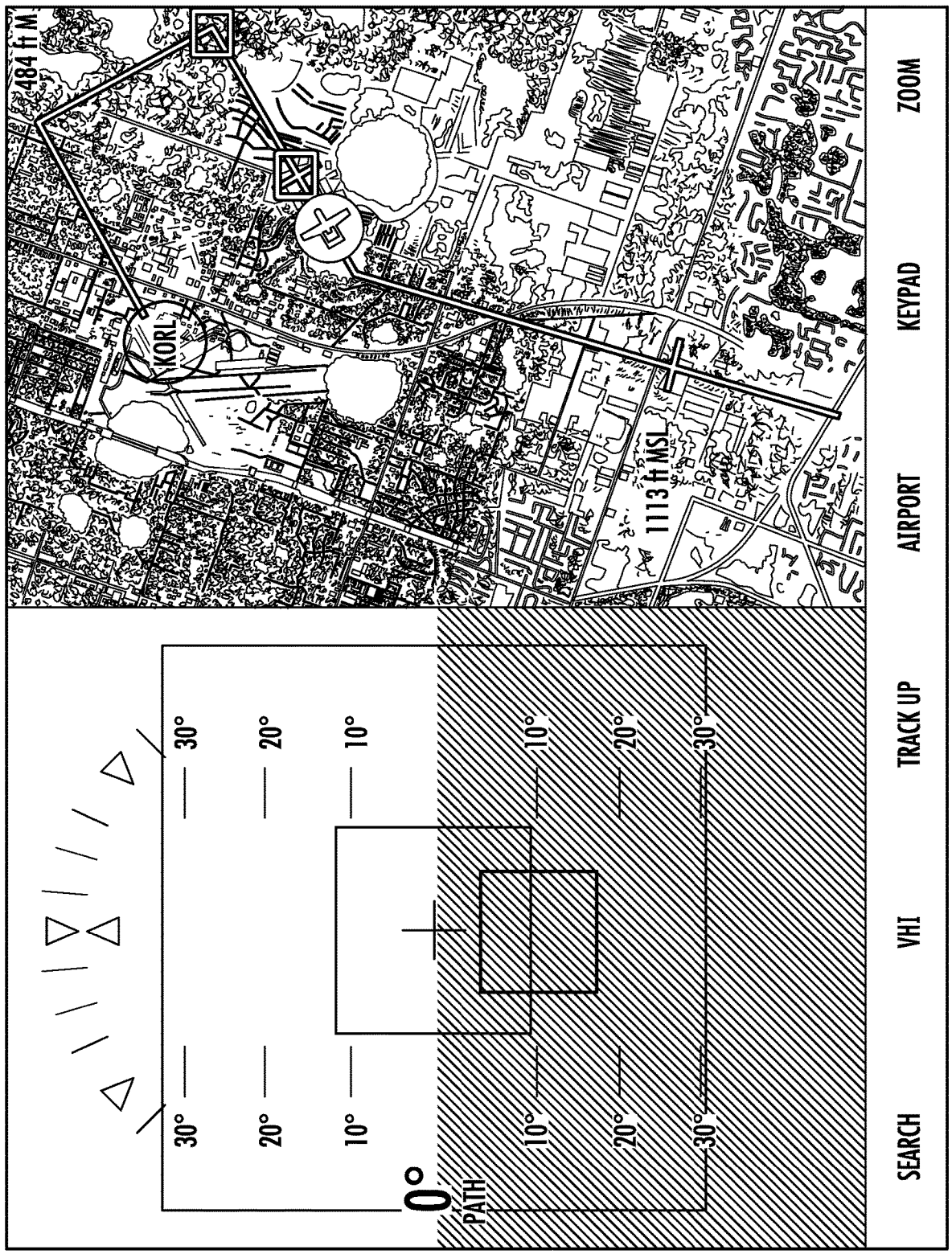

Referring to FIG. 39, the aircraft has passed through a turning point between the approach leg and downwind leg and is on the downwind leg. At the moment captured in this figure, the two check boxes on the overhead graphical view are an altitude gate on a downwind leg and a turning point between the downwind leg and a base leg. HUD shows the aircraft on the top of the square guidance box but centered between the two vertical lines of the square guidance box. This means the aircraft is above the calculated altitude on the planned descent course. A pilot will need to decrease the aircraft altitude to fit the aircraft symbol to the square guidance box.

Figure 40:
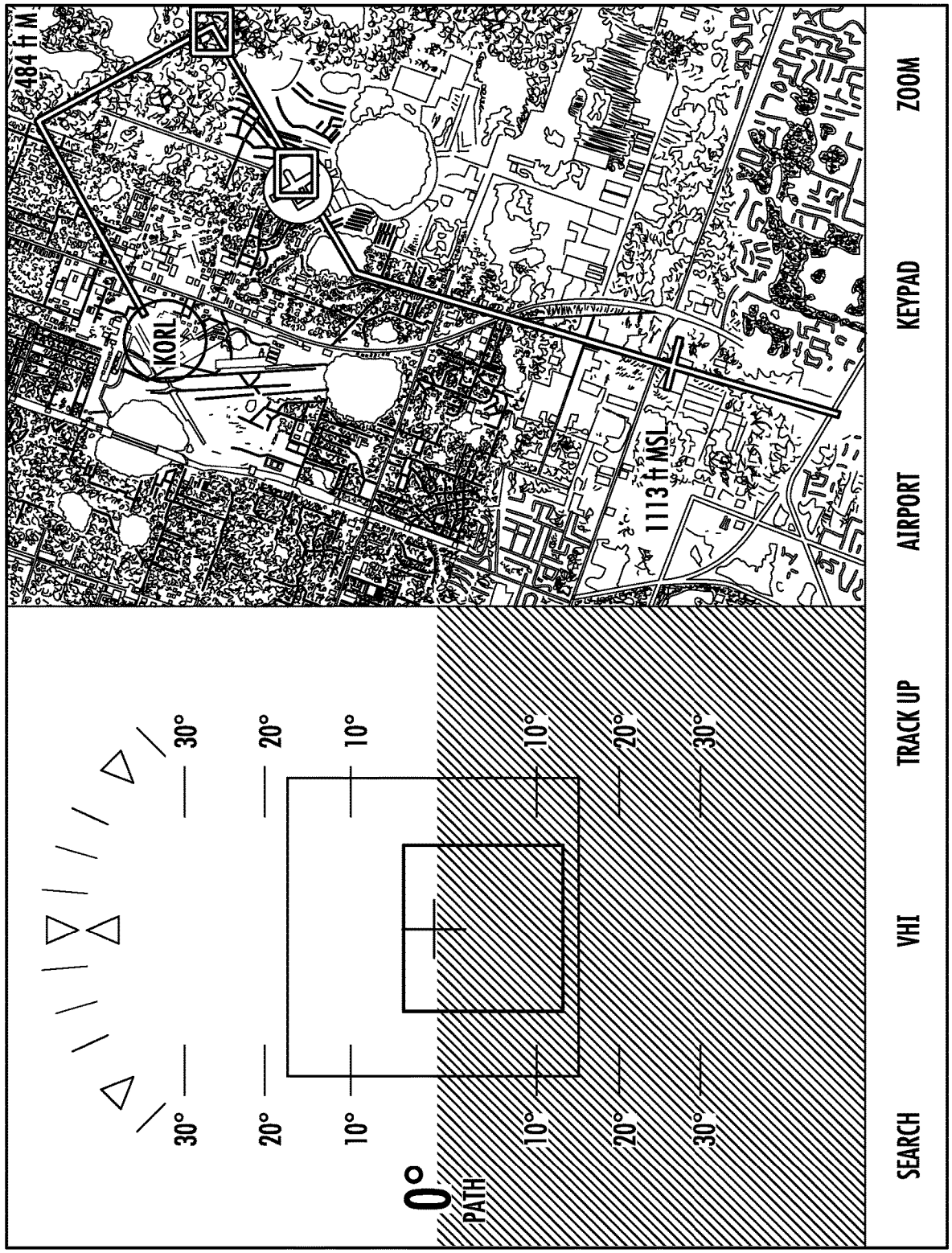

Referring to FIG. 40, the aircraft is flying through an altitude gate on the downwind leg. HUD shows the aircraft still slightly above the calculated altitude on the descent course. The pilot will still need to decrease the aircraft altitude to fit the aircraft symbol to the center of the square guidance box in HUD.

Figure 41:
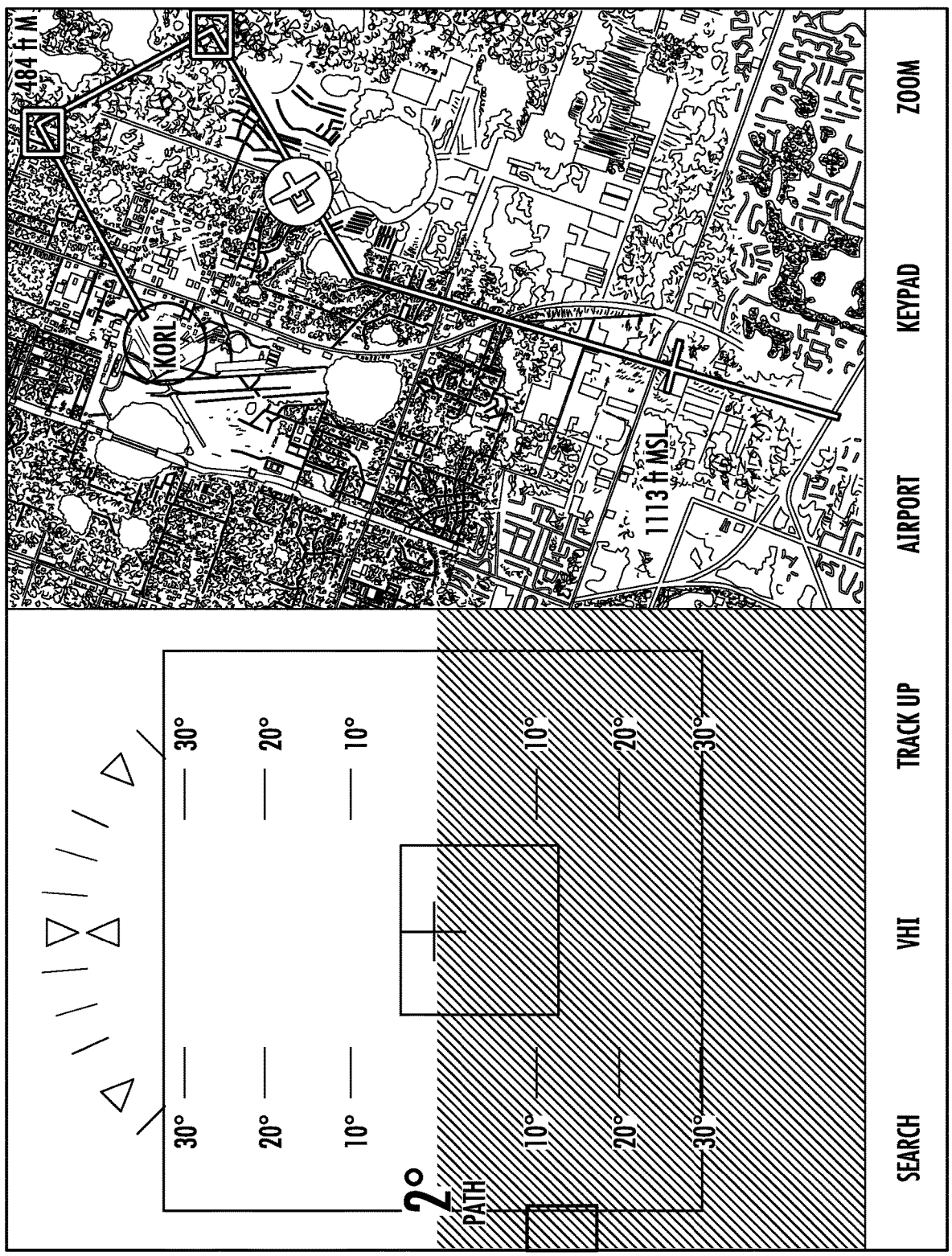

Referring to FIG. 41, the aircraft has flown through the altitude gate on the downwind leg. At the moment captured in this figure, the two check boxes on the overhead graphical view are a turning point between the downwind leg and the base leg and a turning point between the base leg and final leg. HUD shows the square guidance box on the left side of the aircraft. This indicates the pilot will need to turn the aircraft to the left to follow the planned approach and landing path.

Figure 42:
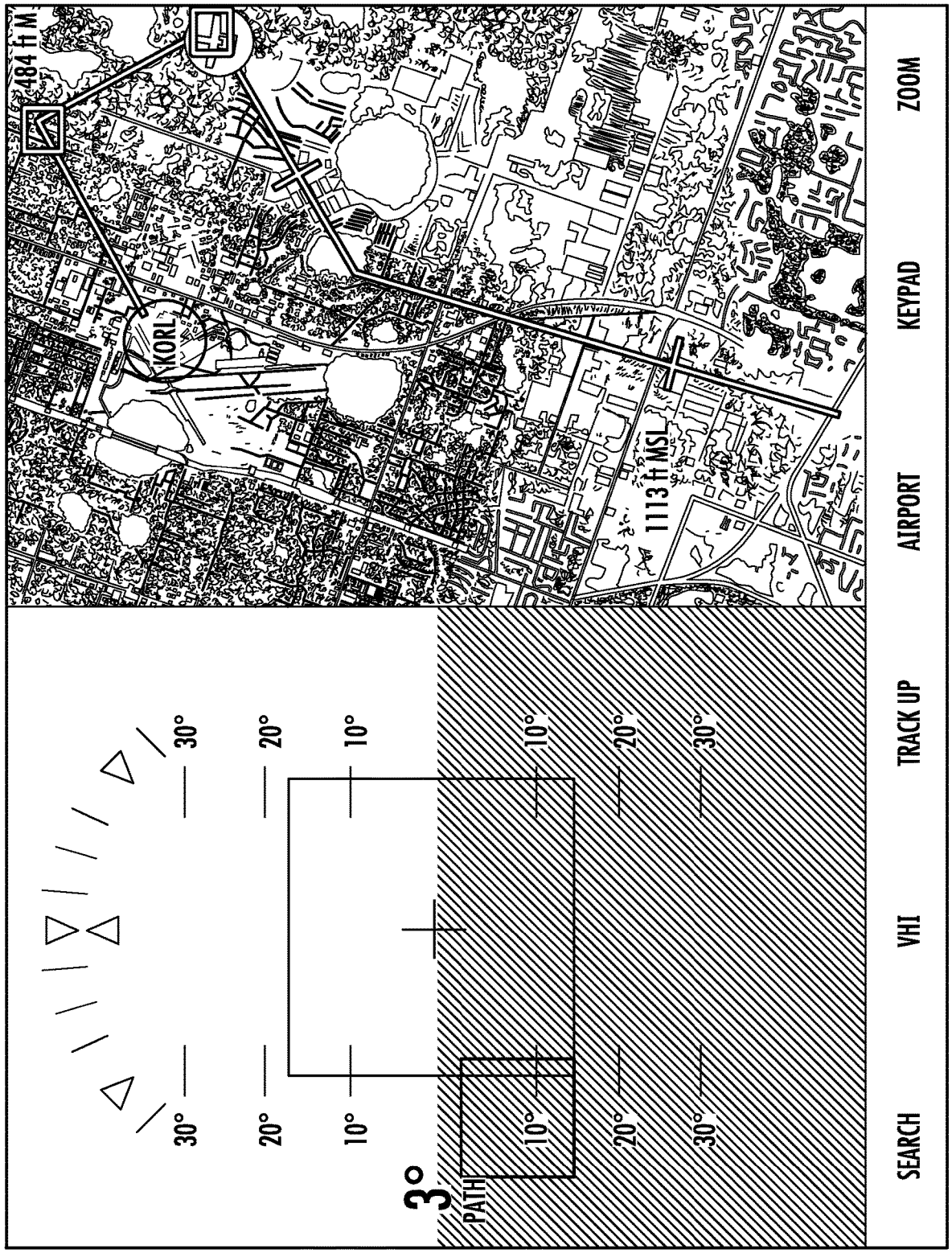

Referring to FIG. 42, the aircraft is on the turning point between the base leg and final leg. At the moment captured in this figure, the two check boxes on the overhead graphical view are still the turning point between the downwind leg and the base leg and the turning point between the base leg and the final leg. HUD shows the square guidance box still on the left side of the aircraft, but more in the center than shown in FIG. 39. This indicates the pilot will need to make a minor left turn to follow the planned approach and landing path.

Figure 43:
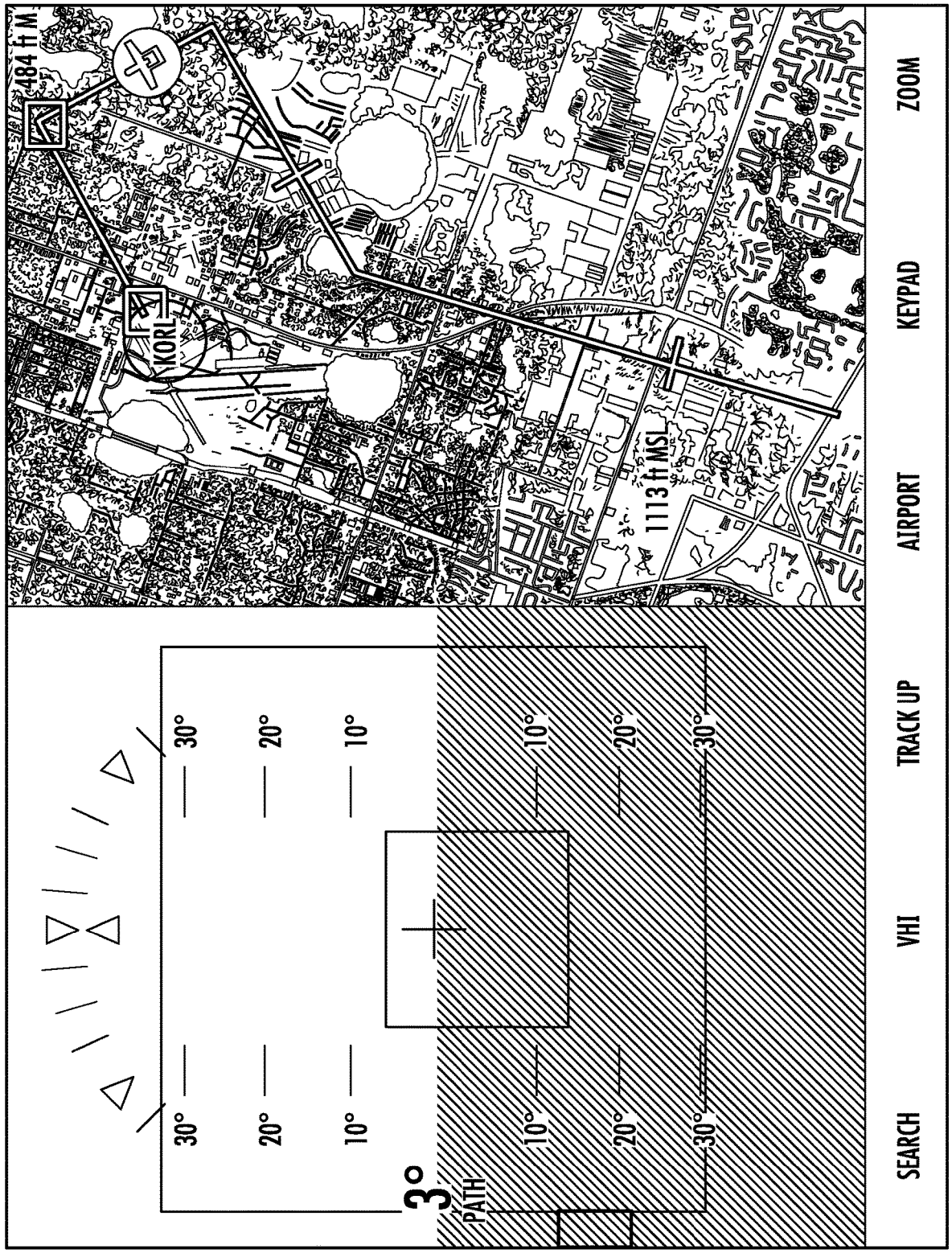

Referring to FIG. 43, the aircraft has flown through the turning point between the downwind leg and the base leg. At the moment captured in this figure, the two check boxes on the overhead graphical view are the turning point between the base leg and the final leg and a landing point. HUD shows the guidance box on the left side of the aircraft, meaning the pilot will need to turn the aircraft to the left to follow the planned landing path.

Figure 44:
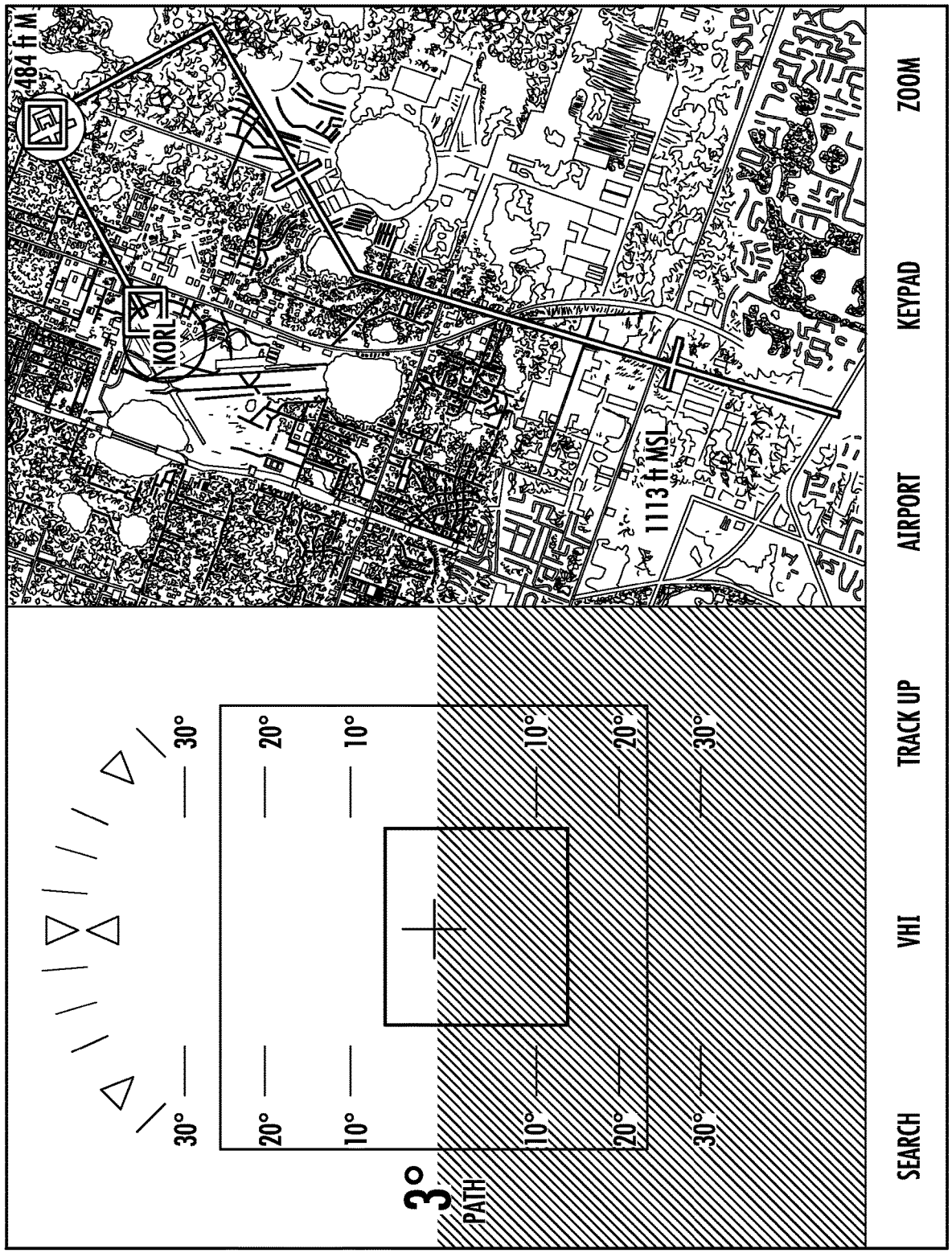

Referring to FIG. 44, the aircraft is flowing through the turning point between the base leg and final leg. At the moment captured in this figure, the two check boxes on the overhead graphical view are the turning point between the base leg and final leg and a landing point. HUD shows the aircraft in the center of the two vertical sides of the square guidance box, and on the upper portion of the square guidance box. This indicates a pilot will need to decrease the altitude slightly of the aircraft to follow the planned landing path.

Figure 45:
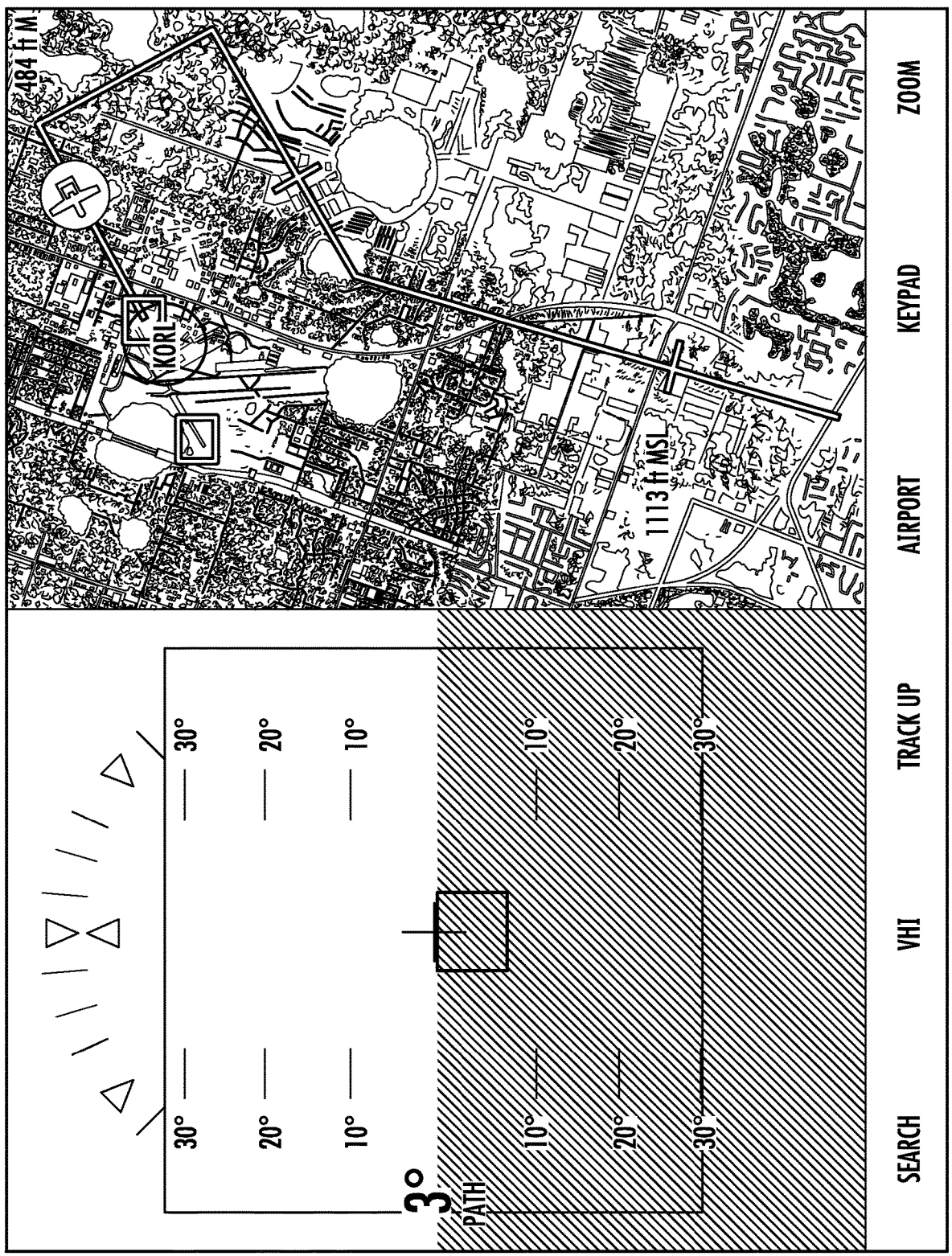

Referring to FIG. 45, the aircraft is flying at the final leg. At the moment captured in this figure, the two check boxes on the overhead graphical view are the landing point and a distant point along with the runway and the final leg. HUD shows the square guidance box on the center between the two vertical sides of the square guidance box, but the aircraft is on the top of the square guidance box, meaning a pilot will need to decrease the altitude of the aircraft to follow the planned landing path.

Figure 46:
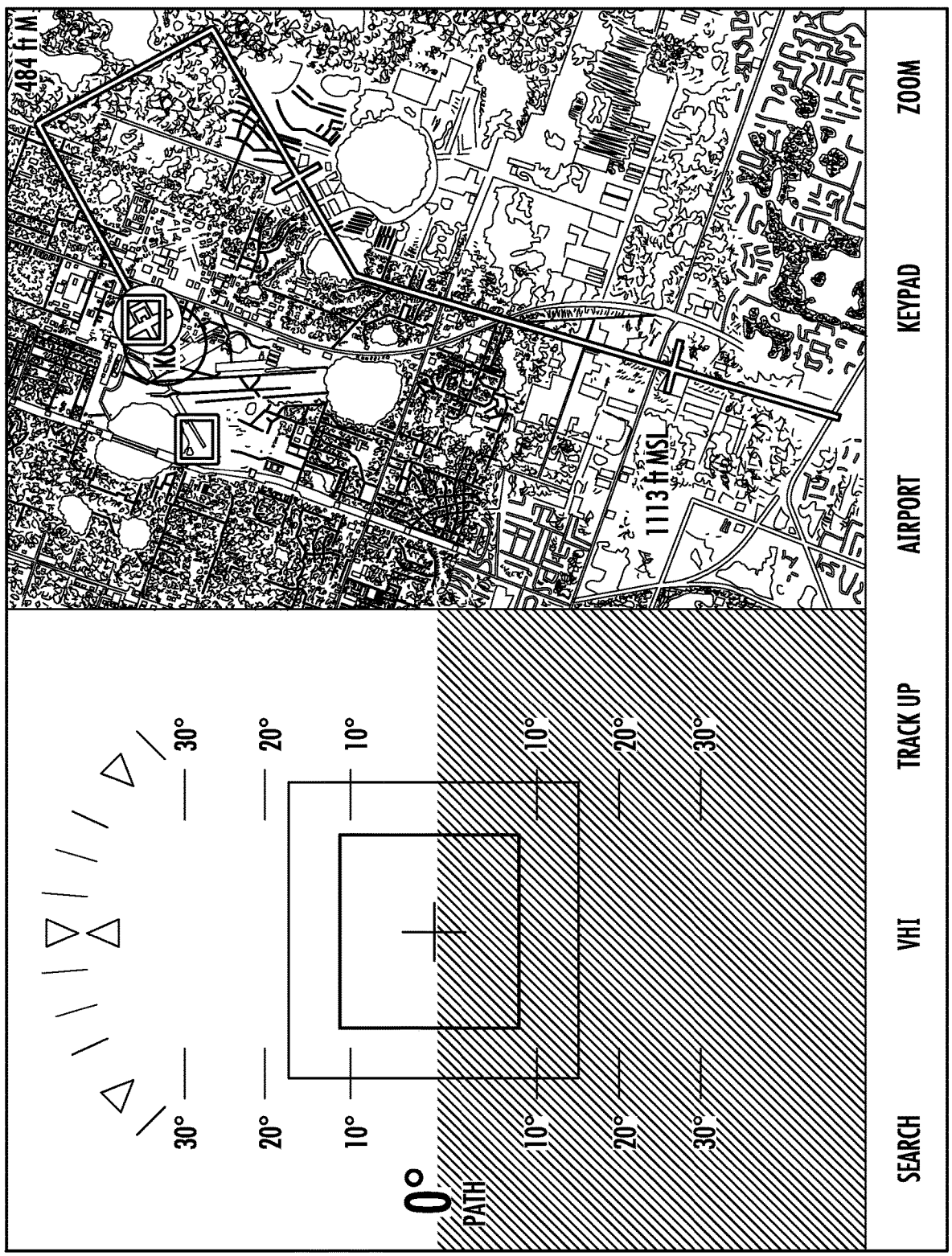

Referring to FIG. 46, the aircraft is landing. At the moment captured in this figure, the two check boxes in overhead graphical view are the same as those in FIG. 45. HUD shows the aircraft symbol in the center of the square box, meaning a pilot is right on the planned landing path and is expected to have a successful landing.

It can be seen from FIGS. 33-46 that as the aircraft gets closer to intercept, the size of the square box can increase in HUD and then fades away as an aircraft lands safely. The size, shape and color of the square box on the HUD can be customized as desired.

In an approach and/or landing, a pilot only needs to maneuver the aircraft to make it go through the center of the moving guidance box and lead down to a runway or landing surface. The HUD enables a pilot to view the status of approach and landing without refocusing to view outside of an aircraft and/or other instruments on the aircraft instrument panel. The HUD makes the aircraft's approach and landing intuitive and significantly improves the safety of landing.

Figure 47:
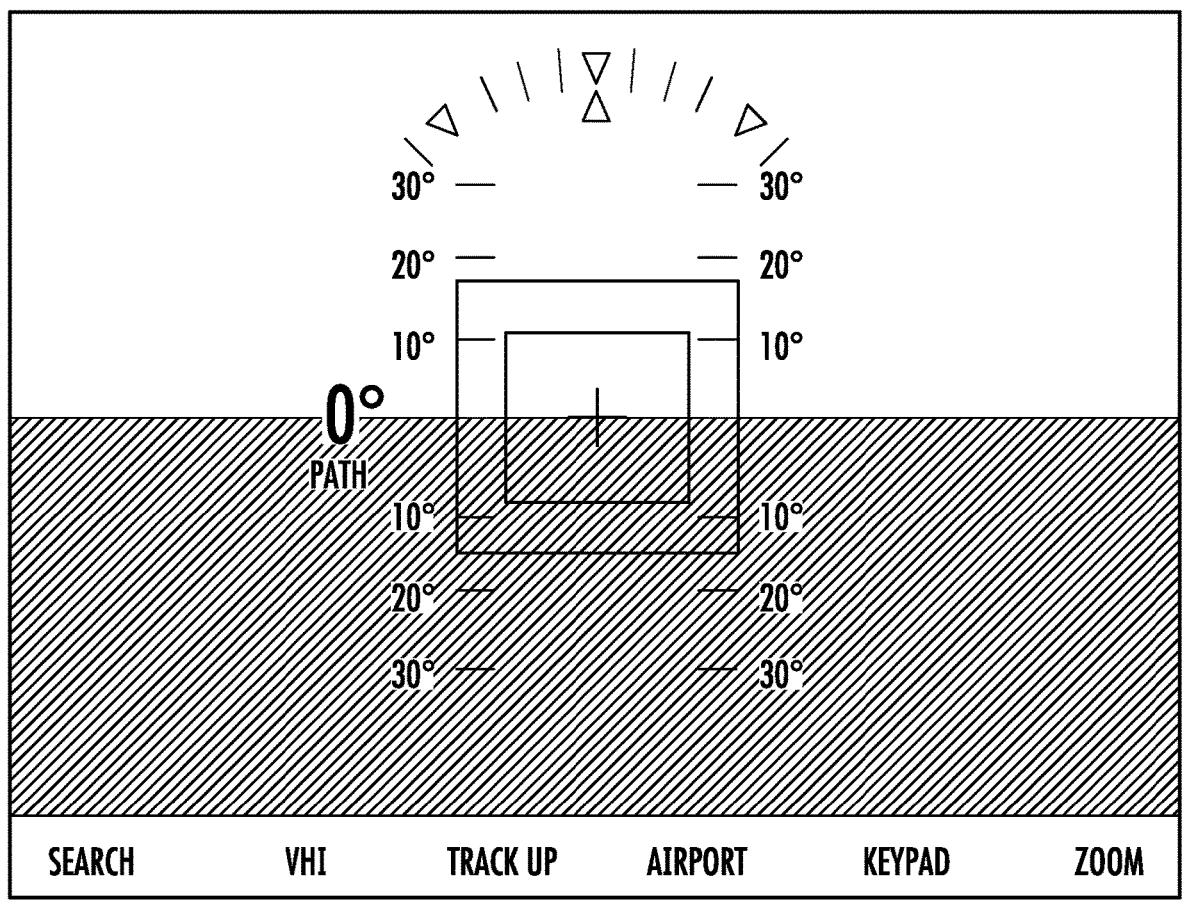
FIG. 47 is an example full screen view of a head-up display.

FIG. 47 indicates a full screen HUD rather than a split view as shown in FIGS. 31-44 when a user desires.

Figure 48:
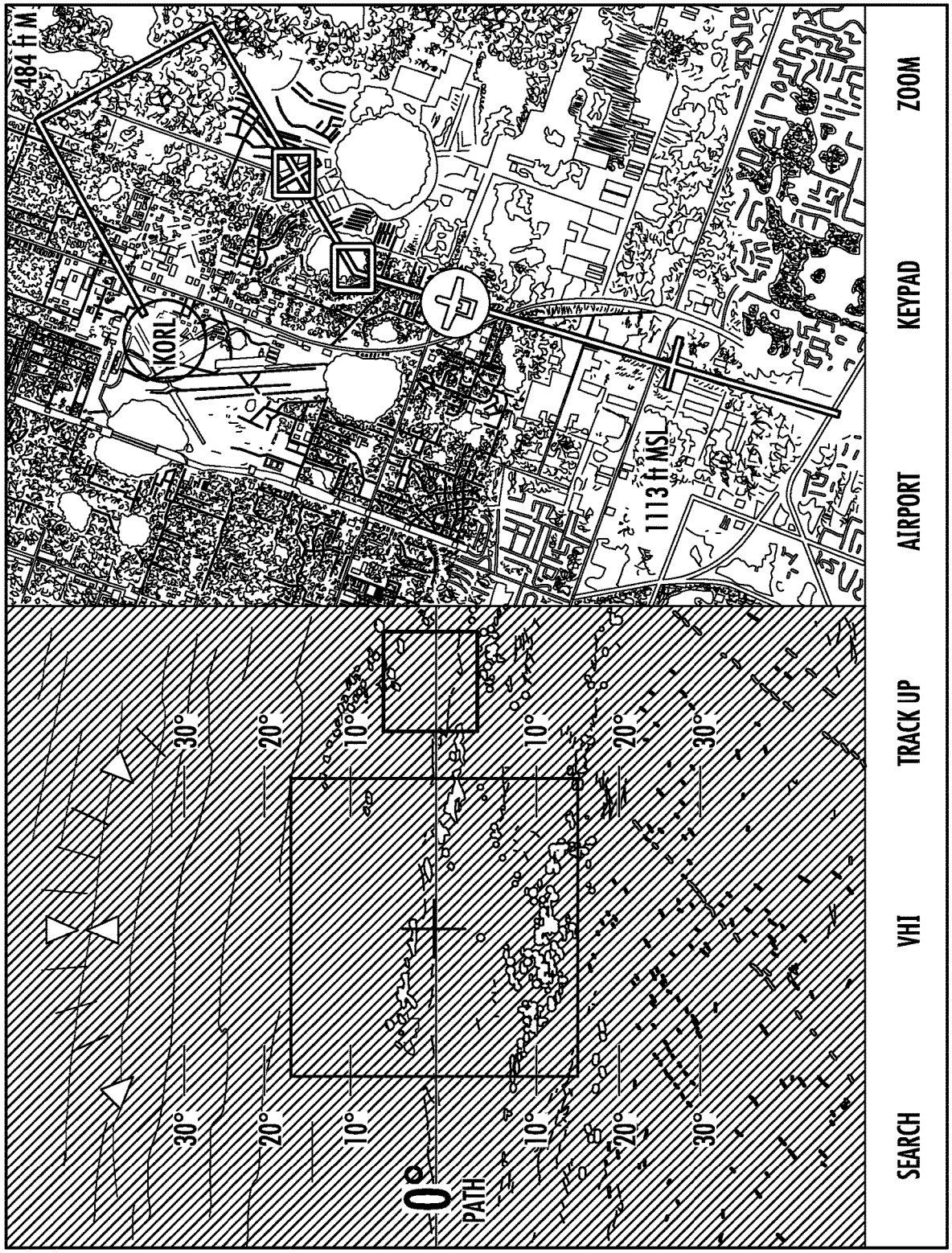
FIG. 48 is a split screen view having a head-up display superimposed on a camera view.
Figure 49:
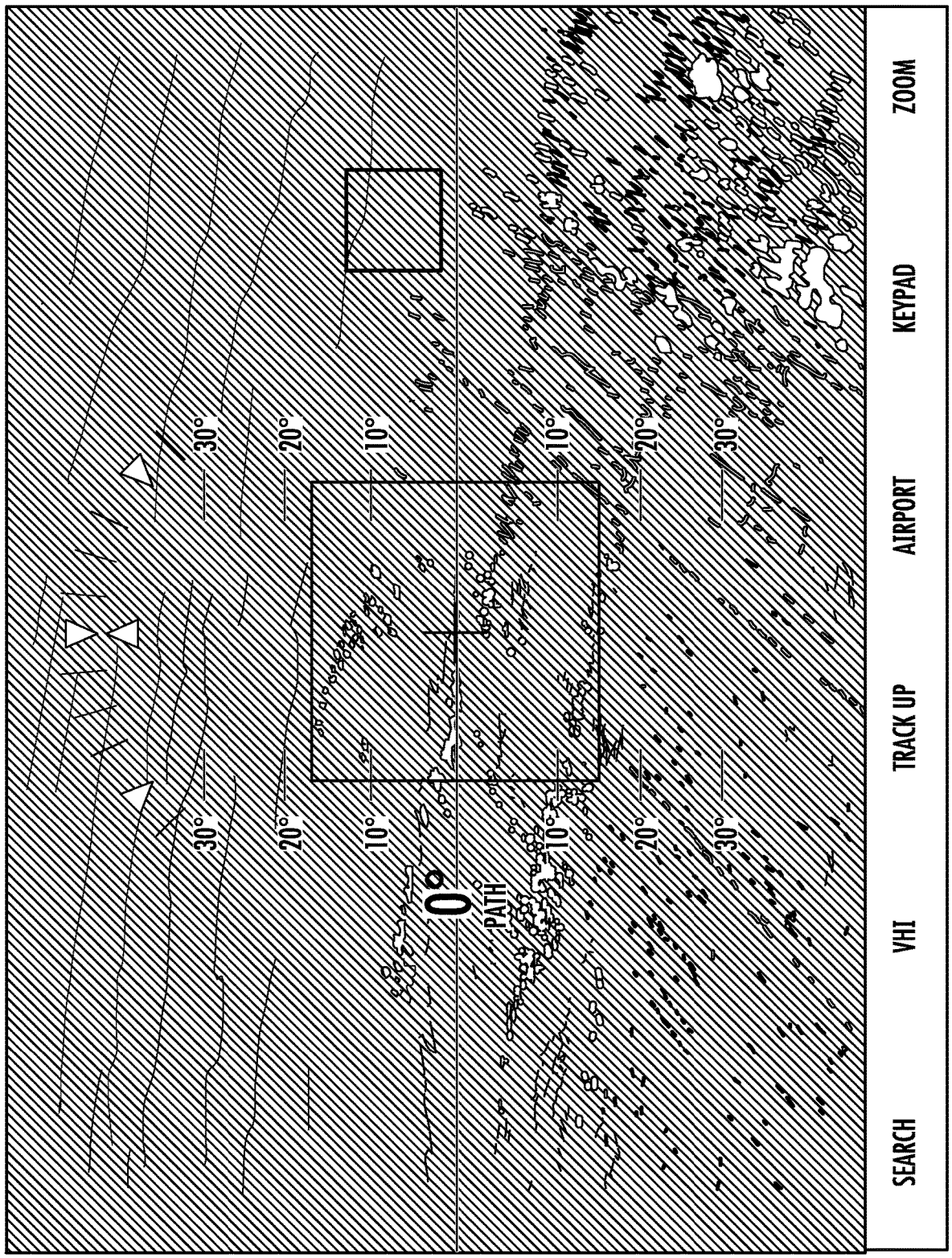
FIG. 49 is a full screen view of an augmented reality head-up display.

FIG. 48 is a split screen view of a HUD superimposed on a camera view on the left side and an overhead graphical view on the right side. The superimposed HUD can provide a realistic and intuitive view of the outside world. FIG. 49 is a full-screen HUD display of FIG. 48.

Figure 50:
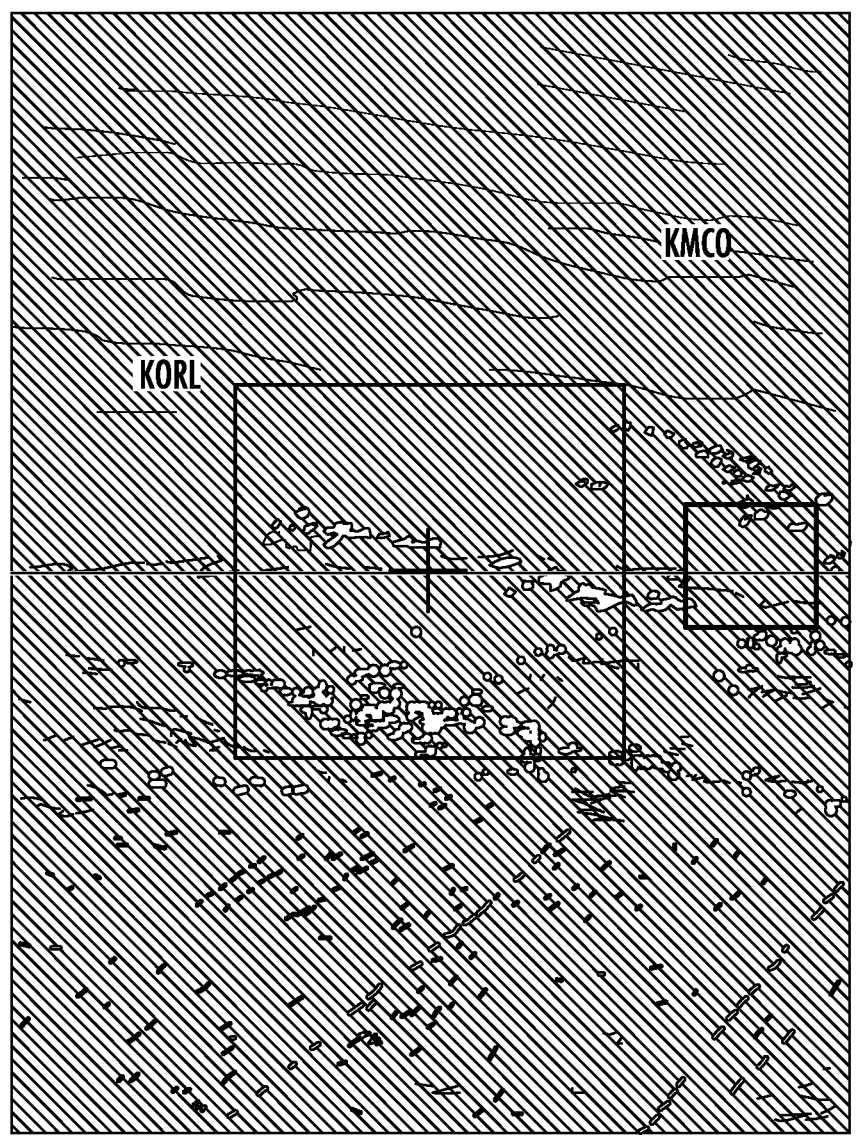
FIG. 50 illustrates a head-up display on a user's mobile device or a visor on a helmet.

FIG. 50 illustrates a HUD on a user's mobile device or a visor on a helmet. This enables the system 10 to be incorporated into a real or a simulated (e.g., gaming) environment.

Figure 51:
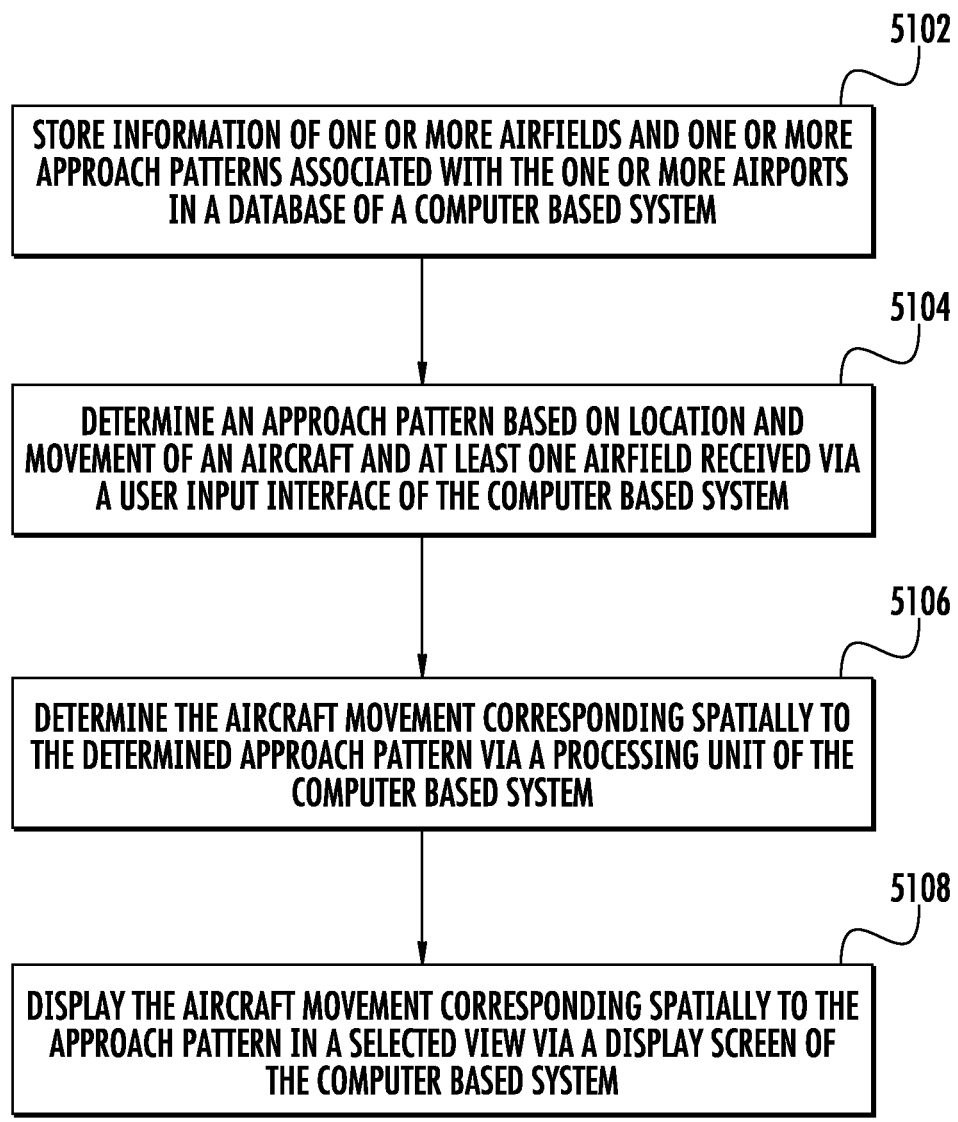
FIG. 51 is a flowchart illustrating a method for facilitating aircraft approaching and landing, according to another embodiment of the present invention.

Referring to FIG. 51, according to one embodiment of the present invention, a method for facilitating aircraft approach includes, at step 5102, storing information on one or more airfields and one or more approach patterns associated with the one or more airfields in a database of a computer-based system. The airfield information stored in the database includes airfield information, runway information and runway end information. As an example, the airfield information includes coordinates, an identifier, a designator, a location indicator, name, type, filed elevation, ownership type, manager and radio frequency associated with one or more airfields. As another example, runway information includes an identifier, designator, length, width, composition, surface condition, and longitude and latitude of runway ends. As another example, the runway end information includes an identifier, a designator, coordinates, bearing, elevation, elevation of a touchdown zone, and a glide path associated with the runway end.

At step 5104, an approach pattern is selected based on location and movement of an aircraft via a user input interface of the computer-based system. An approach pattern selection includes conducting a text entry search for airfields stored in the database based on one or more criteria (e.g., city, state, airfield designator, and airfield name, etc.). The approach pattern can be selected based on one or more of airfield name, airfield identifier, and aircraft location. In one embodiment, if an approach pattern is not available for selection, a suitable approach pattern can be created via inputting aircraft and runway information.

At step 5106, the aircraft movement corresponding spatially to the selected approach pattern is determined via a processing unit of the computer-based system. As another example, rate of descent is determined if the aircraft is a helicopter. The approach pattern is periodically updated in response to the aircraft movement. When a runway the aircraft approaches is moving, a real-time location of the moving runway is taken into account in calculating aircraft movement corresponding spatially to the selected approach pattern.

At step 5108, the aircraft movement corresponds spatially to the approach pattern in a selected view is displayed via a display screen of the computer-based system. As an example, selected view includes a glide path guidance indicator indicating whether an aircraft is vertically above or below a glide path. As another example, a selected view includes an overhead graphical view (e.g., aerial view, satellite view) showing one or more of a runway, a pattern altitude, an entry angle, and respective lengths associated with and one or more altitude gates and descent gates associated with the approach pattern. Other views such as HUD can be superimposed on a camera view. The selected view can also include one or more of aircraft coordinate, altitude, horizontal accuracy, vertical accuracy, course, speed, timestamp of the aircraft in real-time. The selected view can be displayed in a specific orientation. Colored indicators are used to distinguish between different types of airfields. An airfield information diagram and a standard aviation chart can also be displayed on the display screen if needed.

It will be appreciated that the user interface implemented by the system and method of the claimed invention allows for a highly intuitive maneuver guidance for pilots, enhancing safety of arrival, approach and landing. The system can be used to facilitate aircraft arrival, approach, and landing is real-time. The system can be used by student pilot, novice, and airline pilots, instructors, air traffic controllers, airfield operators, military, and regulatory agencies. The system provides an enhanced experience in performing a safe approach and landing at any moving runway in the world. The system can also be used in traffic simulation in gaming environment.

The disclosed method does not require maintenance of ILS and greatly reduces maintenance cost. The system is also versatile and can be used for any moving landing surface anywhere in the world. The disclosed user interface system can be used by aircraft, such as helicopters, airplanes and unmanned aerial vehicles.

From the foregoing, it will be appreciated the system and method of the present invention implement a user interface that allows a computer to facilitate the complex, changeable and circumstance dependent aircraft landing and approach evolutions. As discussed above, the computer-based system and method can also advantageously interface with autopilots, navigational systems and other networks and devices to further facilitate landing and approach. The computer-based system can also be used in aircraft departure. In this scenario, aircraft departure pattern can be calculated and displayed.

The above embodiments are provided for exemplary and illustrative purposes; the present invention is not necessarily limited thereto. Rather, those skilled in the art will appreciate that various modification, as well as adaptations to particular circumstances, will fall within the scope of the invention as herein shown and described.

What is claimed is:

1. A graphical user interface (GUI) system for facilitating aircraft approach and landing, the system comprising:
    a display screen;
    an airfield database including runway information for at least one airfield; and
    a processing unit in signal communication with the airfield database and the display screen and configured to:
    display an overhead graphical view on the display screen, the overhead graphical view including the airfield with at least one selectable runway indicator associated therewith;
    after receipt of a runway selection, display a plurality of selectable visual flight rules (VFR) approach pattern indicators to the user on the overhead graphical view; and after receipt of an VFR approach pattern selection, display on the overhead graphical view a selected VFR approach pattern, the selected VFR approach pattern being automatically determined based on the runway information.

2. The GUI of claim 1, wherein the processing unit is further configured to:
    receive location inputs from a user for ends of at least one runway of an airfield not already in the airfield database; and
    automatically generate runway information based on the location inputs and store the runway information in the airfield database.

3. The GUI of claim 2, wherein the processing unit is configured to receive inputs of latitude and longitude for the ends of the at least one runway.

4. The GUI of claim 3, wherein the processing unit is further configured to receive inputs of elevations for the ends of the at least one runway.

5. The GUI of claim 3, wherein the processing unit is configured to receive the location inputs as selections of points on the overhead graphical view.

6. The GUI of claim 2, wherein the at least one runway is on water.

7. The GUI of claim 2, wherein the runway information includes reciprocal runway heading numbers.

8. The GUI of claim 7, wherein the runway information further includes a runway length.

9. The GUI of claim 7, wherein the processing unit is configured to subsequently display the at least one selectable runway indicator as one of the reciprocal runway heading numbers at a corresponding one of the ends and to display another selectable runway indicator as another of the reciprocal runway heading numbers at another corresponding one of the ends.

10. The GUI of claim 9, wherein the processing unit is configured to display each of the plurality of selectable VFR approach pattern indicators at a beginning of the selected runway.

11. The GUI of claim 10, wherein the processing unit is configured to display the plurality of selectable VFR approach pattern indicators on the overhead graphical view with straight-in and direct-to-final indicators aligned with the selected runway, downwind-right and direct-to-base-right indicators being located to the right of the straight-in and direct-to-final indicators, respectively, and the downwind-left and direct-to-base-left indicators being located to the left of the straight-in and direct-to-final indicators, respectively.

12. The GUI of claim 1, wherein the processing unit is configured to display the selected VFR approach pattern on the overhead graphical view using a set of default pattern values.

13. The GUI of claim 12, wherein the processing unit is configured with a plurality of sets of default pattern values, differing based on aircraft category.

14. The GUI of claim 13, wherein the processing unit is configured to display on the overhead graphical view a status indicator that indicates which of the plurality of sets of default pattern values is in use.

15. The GUI of claim 12, wherein the processing unit is configured to display on the overhead graphical view a keypad permitting a user to select different values for the set of default pattern values.

16. The GUI of claim 15, wherein the processing unit is configured to update selections available on the keypad based on the VFR approach pattern selection.

17. The GUI of claim 16, wherein the processing unit is configured to receive a current aircraft location input and to update selections available on the keypad based on where an aircraft is relative to the selected VFR approach pattern.

18. The GUI of claim 15, wherein the processing unit is configured to permit a user to select different values for at least one of: pattern altitude, entry angle, downwind leg length, base leg length, report distance and glide path angle.

19. The GUI of claim 1, wherein the processing unit is configured to receive a current aircraft location input and to automatically adapt the selected VFR approach pattern based on the current aircraft location input.

* * * * *